US012032067B2

(12) United States Patent
Urtasun et al.

(10) Patent No.: US 12,032,067 B2
(45) Date of Patent: Jul. 9, 2024

(54) SYSTEM AND METHOD FOR IDENTIFYING TRAVEL WAY FEATURES FOR AUTONOMOUS VEHICLE MOTION CONTROL

(71) Applicant: UATC, LLC, Mountain View, CA (US)

(72) Inventors: Raquel Urtasun, Toronto (CA); Min Bai, Toronto (CA); Shenlong Wang, Toronto (CA)

(73) Assignee: UATC, LLC, Mountain View, CA (US)

( * ) Notice: Subject to any disclaimer, the term of this patent is extended or adjusted under 35 U.S.C. 154(b) by 383 days.

(21) Appl. No.: 17/547,340

(22) Filed: Dec. 10, 2021

(65) Prior Publication Data

US 2022/0101600 A1 Mar. 31, 2022

Related U.S. Application Data

(63) Continuation of application No. 16/684,689, filed on Nov. 15, 2019, now Pat. No. 11,217,012.

(51) Int. Cl.
*G01S 17/931* (2020.01)
*G06T 7/10* (2017.01)
(Continued)

(52) U.S. Cl.
CPC .............. *G01S 17/931* (2020.01); *G06T 7/10* (2017.01); *G06T 7/70* (2017.01); *G06T 17/00* (2013.01);
(Continued)

(58) Field of Classification Search
CPC ................. G01S 17/931; G01S 13/867; G01S 2013/9318; G01S 2013/9323; G06T 7/10; (Continued)

(56) References Cited

U.S. PATENT DOCUMENTS

| 2019/0043203 A1* | 2/2019 | Fleishman | G06F 18/29 |
| 2019/0138817 A1* | 5/2019 | Hummelshøj | G06V 40/20 |
| 2019/0188541 A1* | 6/2019 | Wang | G01S 7/4802 |

* cited by examiner

*Primary Examiner* — Christopher M Brandt
(74) *Attorney, Agent, or Firm* — Dority & Manning, P.A.

(57) ABSTRACT

Systems and methods for identifying travel way features in real time are provided. A method can include receiving two-dimensional and three-dimensional data associated with the surrounding environment of a vehicle. The method can include providing the two-dimensional data as one or more input into a machine-learned segmentation model to output a two-dimensional segmentation. The method can include fusing the two-dimensional segmentation with the three-dimensional data to generate a three-dimensional segmentation. The method can include storing the three-dimensional segmentation in a classification database with data indicative of one or more previously generated three-dimensional segmentations. The method can include providing one or more datapoint sets from the classification database as one or more inputs into a machine-learned enhancing model to obtain an enhanced three-dimensional segmentation. And, the method can include identifying one or more travel way features based at least in part on the enhanced three-dimensional segmentation.

20 Claims, 8 Drawing Sheets

Related U.S. Application Data

(60) Provisional application No. 62/869,251, filed on Jul. 1, 2019, provisional application No. 62/768,829, filed on Nov. 16, 2018.

(51) Int. Cl.
*G06T 7/70* (2017.01)
*G06T 17/00* (2006.01)
*G06T 17/10* (2006.01)
*G06V 10/26* (2022.01)
*G06V 10/80* (2022.01)
*G06V 20/56* (2022.01)
*G06V 20/58* (2022.01)

(52) U.S. Cl.
CPC .............. *G06T 17/10* (2013.01); *G06V 10/26* (2022.01); *G06V 10/803* (2022.01); *G06V 20/56* (2022.01); *G06V 20/582* (2022.01); *G06T 2207/20081* (2013.01); *G06T 2207/20084* (2013.01); *G06T 2207/30252* (2013.01)

(58) Field of Classification Search
CPC ........... G06T 7/70; G06T 17/00; G06T 17/10; G06T 2207/20081; G06T 2207/20084; G06T 2207/30252; G06V 10/26; G06V 10/803; G06V 20/56; G06V 20/582; G06F 18/251
See application file for complete search history.

SYSTEM AND METHOD FOR IDENTIFYING TRAVEL WAY FEATURES FOR AUTONOMOUS VEHICLE MOTION CONTROL

PRIORITY CLAIM

The present application is a continuation of and claims the benefit of priority to U.S. patent application Ser. No. 16/684,689. The present application is based on and claims benefit of both of U.S. Provisional Application No. 62/869,251 having a filing date of Jul. 1, 2019 and U.S. Provisional Application No. 62/768,829 having a filing date of Nov. 16, 2018. Each of the applications are incorporated by reference herein in their entireties.

FIELD

The present disclosure relates generally to devices, systems, and methods for identifying travel way features. More particularly, the present disclosure relates to systems and methods for identifying travel way features based on two- and three-dimensional data associated with the surrounding environment of a vehicle.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. In addition, an autonomous vehicle can utilize preconfigured high definition maps to gain an understanding of static features within its environment. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

Other example aspects of the present disclosure are directed to systems, methods, vehicles, apparatuses, tangible, non-transitory computer-readable media, and memory devices for controlling autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
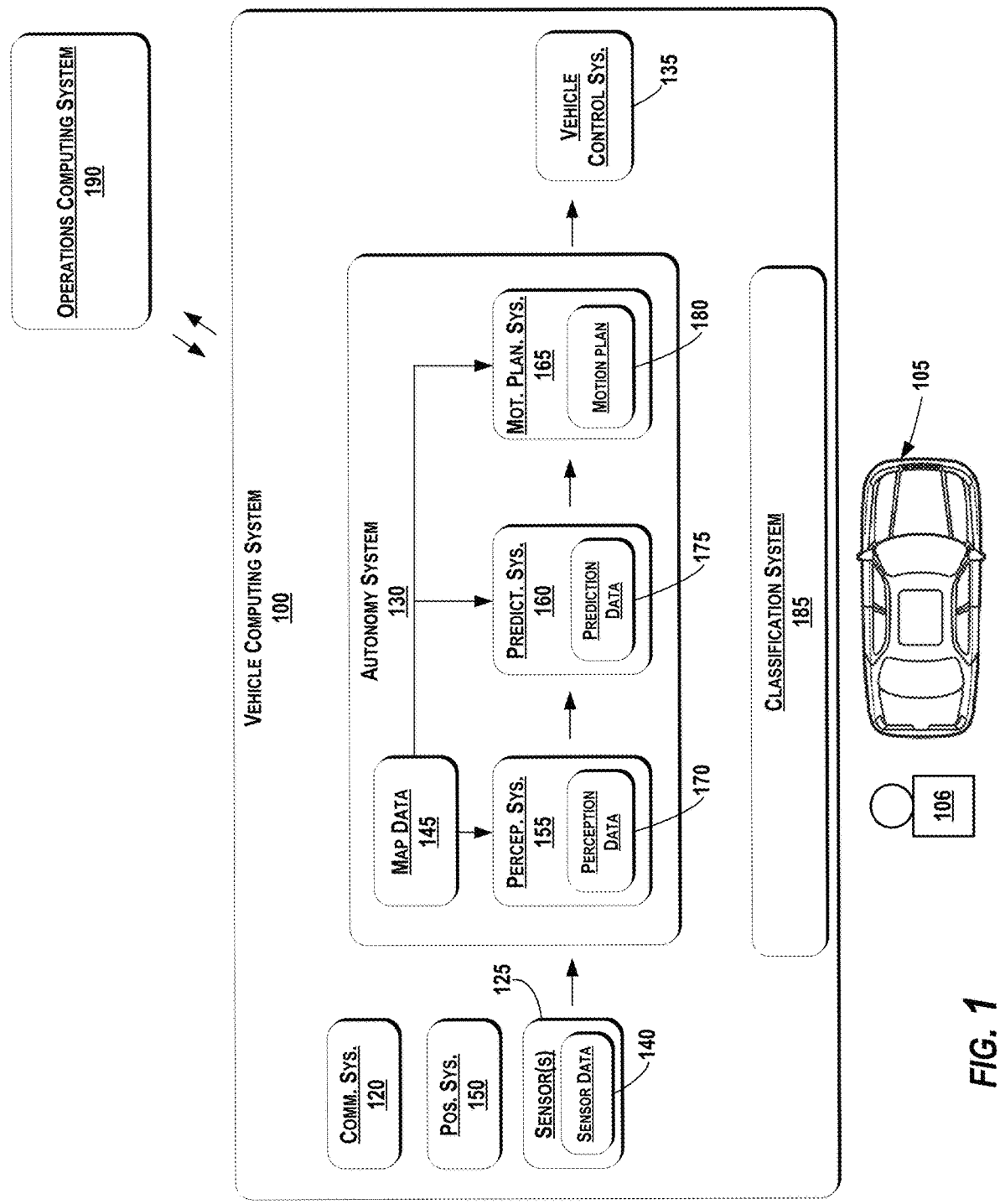
FIG. 1 depicts an example system overview according to example implementations of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to improved systems and methods for detecting the environment surrounding a vehicle such as, for example, an autonomous vehicle. This can include, for instance, the identification of travel way features (e.g., construction cones, signs, etc.) in real time. To do so, the systems and methods of the present disclosure utilize a non-parametric memory representation for spatio-temporal segmentation that captures the local space and time around a vehicle. The non-parametric memory representation can be indicative of a "graph" that provides a current best estimate for segmentation of aggregated point clouds. This representation allows the vehicle to remember what it has observed in the past, while also reinforcing and forgetting its past beliefs based on new data. As described herein, this can improve detection uncertainty and reduce the effect of false positives. For example, an autonomous vehicle (e.g., ground-based vehicle, aircraft, etc.) can include various systems and devices configured to control the operation of the vehicle. For example, an autonomous vehicle can include an onboard vehicle computing system (e.g., located on or within the autonomous vehicle)

that is configured to operate the autonomous vehicle. The vehicle computing system can obtain sensor data from sensor(s) onboard the vehicle (e.g., cameras, LIDAR, RADAR, GPS, etc.), access one or more preconstructed maps (stored in memory on board or remote from an autonomous vehicle) and generate an appropriate motion plan through the vehicle's surrounding environment based on the preconstructed maps. Changing circumstances in the real world such as, construction, temporary lane closures, lane repainting, or speed limit changes, however, can limit the accuracy of preconstructed maps.

To compensate for limitations in accuracy and improve situational awareness, online reasoning according to the systems and methods described herein can be utilized to identify travel way features in real time. For instance, an autonomous vehicle can include a classification system configured to accurately identify travel way features, such as, for example construction elements or signs. The classification system can utilize two and three dimensional data along with historical observations to supplement preconstructed maps with real time travel way features. By way of example, three-dimensional datapoints indicative of feature classification(s) at three-dimensional coordinate(s) can be generated based on two-dimensional data (e.g., a plurality of pixels, an image, etc.) and three-dimensional data (e.g., point-cloud data, LiDAR data, etc.) associated with a surrounding environment of a vehicle. The two-dimensional data and the three-dimensional data can be obtained via sensor(s) (e.g., cameras, LiDAR sensors, etc.) onboard the autonomous vehicle. The two-dimensional data can be provided as one or more inputs into a machine-learned segmentation model to receive a two-dimensional segmentation as one or more outputs of the machine-learned segmentation model indicative of feature classification(s). The two-dimensional segmentation can be used, in combination with the three-dimensional data, and the two-dimensional data, to generate a current three-dimensional segmentation (e.g., a 3-D segmentation at a current/present time step) including a plurality of current three-dimensional datapoints (e.g., 3-D datapoints at the current/present time step).

Travel way features can be identified in real time based on the current three-dimensional segmentation. In some implementations, the travel way features can be identified based on second data of a classification database. For example, the travel way feature can be identified based on an enhanced three-dimensional segmentation generated according to historical observations. For instance, the current three-dimensional segmentation can be used to determine an occlusion score (e.g., a probability that a datapoint is valid) for each of a plurality of representations of historical three-dimensional datapoints (e.g., three-dimensional datapoints from previously computed three-dimensional segmentations) stored in a classification database (e.g., a non-parametric memory of three-dimensional datapoints). Each historical three-dimensional datapoint can include feature(s) (e.g., occlusion scores, feature classifications, etc.) associated with a three-dimensional coordinate. The plurality of current three-dimensional datapoints can be stored with the historical three-dimensional datapoints in the classification database. And, set(s) of three-dimensional datapoints from the classification database can be identified and input into a machine-learned enhancing model configured to output an enhanced three-dimensional segmentation. In this manner, feature classifications localized in three-dimensional space can be leveraged with historical observations (e.g., historical three-dimensional datapoints) to identify travel way features in real time. This can allow the autonomous vehicle to react to changes in its surrounding environment in a timely manner (e.g., when approaching a lane closure).

Although many examples are described herein with respect to autonomous vehicles, the disclosed technology is not limited to autonomous vehicles. Any vehicle can utilize the technology described herein for identifying travel way features. For example, the classification system can be configured to identify travel way features within the surrounding environment of any vehicle.

More particularly, an autonomous vehicle (e.g., ground-based vehicle, aircraft, etc.) can include various systems and devices configured to control the operation of the vehicle. As described above, an autonomous vehicle can include a classification system that can help the autonomous vehicle perceive objects within its surrounding environment. The classification system can obtain two-dimensional data depicting a surrounding environment of the vehicle. The two-dimensional data can include a plurality of pixels forming an input image. For example, the input image can be captured via one or more cameras onboard the vehicle. By way of example, the vehicle can include a front facing camera mounted to the vehicle. The front facing camera can be configured to capture one or more images depicting the surrounding environment of the vehicle such as, for example, an environment in front of the vehicle. The classification system can obtain the input image from the one or more cameras and identify the one or more pixels forming the input image. As described herein, the one or more pixels can include rich texture and color information that can be used to classify features within the surrounding environment of the vehicle.

In addition, the classification system can obtain three-dimensional data associated with the surrounding environment of the vehicle. The three-dimensional data can include three-dimensional point cloud data. In some implementations, the three-dimensional point cloud data can be indicative of LiDAR data. For example, the three-dimensional data can include three-dimensional point cloud data indicative of LiDAR data captured via one or more LiDAR sensors onboard the vehicle. By way of example, the three-dimensional data can include a plurality of three-dimensional points obtained from one or more LiDAR sensor sweeps. For instance, one or more LiDAR measurements can provide a sparse set of three-dimensional points per sweep. The sparse set of three-dimensional points can include three-dimensional coordinates localized in the real world surrounding the vehicle. For example, in some implementations, the plurality of three-dimensional points can include one or more three-dimensional Cartesian coordinates.

The classification system can obtain a two-dimensional segmentation based on the two-dimensional data. The two-dimensional segmentation can include a pixel-wise segmentation on an input image. For example, the classification system can assign one or more feature classifications to a respective pixel of the input image based on the texture and color information associated with the respective pixel. For instance, the two-dimensional segmentation can include data indicative of one or more feature classifications associated with one or more of the plurality of pixels forming the input image. In this manner, the two-dimensional segmentation can identify one or more pixels of the plurality of pixels forming the input image that correspond to a feature of interest (e.g., travel way feature).

In some implementations, the classification system can utilize one or more machine learning techniques to receive the two-dimensional segmentation. By way of example, the classification system can provide the two-dimensional data as one or more inputs into a machine-learned segmentation model to receive the two-dimensional segmentation as one or more output(s) of the machine-learned segmentation model. The machine-learned segmentation model can include one or more models. For example, the machine-learned segmentation model can include one or more neural networks such as one or more convolutional neural networks. In some implementations, the machine-learned segmentation model can include a deep convolutional neural network using a ResNet-101 backbone. The machine-learned segmentation model can be trained, via one or more machine-learning techniques, on a dataset of input images annotated with ground truth feature classifications. For example, the machine-learned segmentation model can be trained to label (e.g., with a feature classification) one or more pixels forming an input image based on the texture and color information associated with the one or more pixels. In this manner, the machine-learned segmentation model can be configured to output a two-dimensional segmentation including one or more feature classifications based on an input image.

Each of the one or more feature classifications can be indicative of a semantic travel way feature. In addition, or alternatively, each of the one or more feature classifications can include a class-wise probability estimate. For example, each class-wise probability estimate can indicate the probability that a pixel corresponds to a particular semantic travel way feature. A semantic travel way feature can include any identifiable object within the surrounding environment of the vehicle. For example, in some implementations, the sematic travel way features can include one or more small objects that are critical to safe driving, such as, for example, traffic cones, barrels, traffic signs, etc. In addition, or alternatively, the semantic travel way features can include features not included in a preconstructed map, such as, for example, new traffic signs, buildings, traffic lights, etc.

The classification system can generate a three-dimensional segmentation based at least in part on the two-dimensional data, the three-dimensional data, and the two-dimensional segmentation. For example, the classification system can exploit data fusion strategies to fuse the two-dimensional data, the three-dimensional data, and the two-dimensional segmentation. By way of example, the classification system can project the three-dimensional data onto the plurality of pixels forming the input image. Based on the two-dimensional segmentation, the classification system can match a feature classification associated with a respective pixel of the input image with a three-dimensional point closest to the respective pixel. As a result, the three-dimensional segmentation can include data indicative of a plurality three-dimensional datapoints. The plurality of three-dimensional datapoints can include one or more feature classifications localized in the three-dimensional world surrounding of the vehicle. For example, each of the plurality of three-dimensional datapoints can include a three-dimensional point (e.g., one or more three-dimensional coordinates) and one or more feature classifications corresponding to the three-dimensional point.

In some implementations, the classification system can generate a current three-dimensional segmentation based on the two-dimensional data, the three-dimensional data, and the two-dimensional segmentation. The current three-dimensional segmentation can include data indicative of a plurality of three-dimensional datapoints at a current/present time step. Each of the plurality of current three-dimensional datapoints can include a three-dimensional point and one or more feature classifications associated with the three-dimensional point. For example, the current three-dimensional segmentation can be indicative of a three-dimensional segmentation generated at a current time step. In this manner, the plurality of current three-dimensional datapoints can include the most recently generated three-dimensional datapoints. In some implementations, the classification system can identify one or more travel way features based, at least in part, on the current three-dimensional segmentation. For example, the classification system can identify one or more travel way features by analyzing the one or more feature classifications corresponding to each three-dimensional point in the current three-dimensional segmentation.

In some implementations, the classification system can generate an enhanced three-dimensional segmentation based on historical information stored in a classification database. For example, the classification system can access a classification database communicatively coupled to the classification system. By way of example, the classification database can be stored in memory onboard the vehicle, in one or more remote servers communicatively coupled to the vehicle, etc. For example, in some implementations, the classification database can be located on or more remote servers and the classification system can access the classification database via one or more communication interfaces onboard the vehicle.

The classification database can include a non-parametric memory configured to maintain a record of three-dimensional datapoints corresponding to features of interest. For example, the non-parametric memory can include a stored representation of three-dimensional datapoints corresponding to features of interest. The stored representation can be updated by the classification system to reflect the latest observations to remember previous information, increase estimation confidence, or remove false positives as applicable. More particularly, the classification database can include second data associated with one or more previously generated three-dimensional segmentations. For example, the second data can be indicative of a plurality of three-dimensional datapoints. For instance, the classification database can include a plurality of three-dimensional points indicative of one or more three-dimensional Cartesian coordinates. By way of example, the classification database can include a three-dimensional point for every three-dimensional datapoint in the plurality of three-dimensional datapoints. For instance, the classification database can include a list of each of the one or more three-dimensional points as described by their respective cartesian coordinates.

In some implementations, the classification database can include a graph of three-dimensional points. For example, the classification database can define a dynamic graph based on a spatial relationship between each of the plurality of three-dimensional points. By way of example, the plurality of three-dimensional points can represent a plurality of nodes of the dynamic graph. Each respective node can include a set of edges connecting the respective node to other nodes in the dynamic graph. In some implementations, the set of edges can be defined based on a spatial relationship between the plurality of three-dimensional points. By way of example, the set of edges for each respective node can include the K-nearest spatial neighbors to the three-dimensional point corresponding to the respective node.

In addition, in some implementations, the classification database can include a feature vector corresponding to each three-dimensional point. Each feature vector corresponding to a respective three-dimensional point can include one or more features associated with the respective three-dimensional point. For example, each feature vector can include data indicative of at least one of a feature classification, occlusion score, LiDAR intensity, and/or vehicle distance corresponding to the respective three-dimensional point. By way of example, a feature vector can include a feature classification associated with a respective three-dimensional point collected at all time steps up to the current time step. In addition, or alternatively, a feature vector can include data indicative of an occlusion score assessing the validity of a feature classification associated with the respective three-dimensional point. Moreover, in some implementations, a feature vector can include information such as, for example, an intensity of the LiDAR measurement associated with the respective three-dimensional point, a distance to the vehicle at which a respective three-dimensional point was measured, etc.

In some implementations, the classification database can include second data indicative of one or more historical observations. The second data can be associated with one or more previously generated three-dimensional segmentations. For instance, the classification database can include data indicative of one or more historical three-dimensional segmentations. For example, a historical three-dimensional segmentation can include previously generated three-dimensional segmentations. The previously generated three-dimensional segmentations can include three-dimensional segmentations generated at one, some, or all time steps up to the current time step. For example, each historical three-dimensional segmentation can include a plurality of representations of historical three-dimensional datapoints and each of the plurality of representations of historical three-dimensional datapoints can include a three-dimensional point and one or more feature classifications associated with the three-dimensional point.

The classification database can include second data associated with the one or more previously generated three-dimensional segmentations. For example, the classification database can include second data indicative of the plurality of representations of historical three-dimensional datapoints associated with the one or more previously generated three-dimensional segmentations (e.g., historical three-dimensional segmentations). For example, in some implementations, the classification database can include a non-parametric memory indicative of the plurality of representations of historical three-dimensional datapoints associated with the one or more previously generated three-dimensional segmentations (e.g., historical three-dimensional segmentations). More particularly, the classification database can include a three-dimensional point for each historical three-dimensional datapoint in the plurality of representations of historical three-dimensional datapoints and a feature vector corresponding to each three-dimensional point. In some implementations, the classification database can include data indicative of historical three-dimensional datapoints corresponding to one or more features of interest. For example, the classification database can include a plurality of three-dimensional points associated with a feature classification corresponding to one or more travel way features. As described in greater detail herein, the classification system can identify one or more travel way features based, at least in part, on the current three-dimensional segmentation and the data indicative of the plurality of representations of historical three-dimensional datapoints.

The classification system can access the classification database to store first data indicative of the current three-dimensional segmentation in the classification database. For example, the classification system can access the classification database via one or more communication interfaces onboard the vehicle and store the first data indicative of the current three-dimensional image segmentation in the classification database via the one or more communication interfaces. More particularly, the classification system can store the first data indicative of the plurality of current three-dimensional datapoints of the current three-dimensional segmentation. By way of example, the classification system can store the three-dimensional point corresponding to each of the plurality of current three-dimensional datapoints in the classification database as a part of the list of one or more three-dimensional points. In addition, or alternatively, the classification system can store the feature classification corresponding to each three-dimensional point of the current three-dimensional segmentation in a feature vector of the classification database that corresponds to the three-dimensional point.

In some implementations, the classification system can obtain an enhanced three-dimensional image segmentation based on the data indicative of the plurality of three-dimensional datapoints of the classification database. To do so, the classification system can identify a plurality of datapoint sets from the classification database. Each of the plurality of datapoint sets can include one or more three-dimensional points from the classification database and a feature vector corresponding to each of the one or more three-dimensional points.

In some implementations, the classification system can identify each of the plurality of datapoint sets based on the spatial relationship between each three-dimensional point in the classification database. For example, each datapoint set can include a respective three-dimensional point from the classification database and a 50 K-nearest spatial neighbors associated with the respective three-dimensional point. In some implementations, the classification system can identify a datapoint set for each three-dimensional point in the classification database.

The classification system can provide each of the plurality of datapoint sets as an input into a machine-learned enhancing model to receive the enhanced three-dimensional segmentation. The machine-learned enhancing model can include one or more machine-learned models configured to output an enhanced three-dimensional image segmentation. For example, the machine-learned enhancing model can include a continuous convolutional model. For instance, in some implementations, the continuous convolutional model can consist of four layers with residual connections.

The machine-learned enhancing model can be trained to output an enhanced feature classification for a three-dimensional point based at least in part on the datapoint set corresponding to the three-dimensional point. Accordingly, the enhanced three-dimensional segmentation can include a plurality of enhanced three-dimensional datapoints. Each of the plurality of enhanced three-dimensional datapoints can include a three-dimensional point and an enhanced feature classification associated with the three-dimensional point. The enhanced feature classification associated with each three-dimensional point can include a newly updated estimate for each three-dimensional datapoint based on current and historical observations. The classification system can identify one or more travel way features based at least in part on the enhanced three-dimensional image segmentation. For example, the classification system can identify one or more travel way features by analyzing the one or more enhanced feature classifications corresponding to each three-dimensional point in the enhanced three-dimensional segmentation.

In some implementations, the classification system can identify one or more invalid feature classifications associated with the plurality of representations of historical three-dimensional datapoints. To do so, the classification system can determine an occlusion score for each of the plurality of representations of historical three-dimensional datapoints based at least in part on the current three-dimensional segmentation. The occlusion score, for example, can include a probability that a feature classification associated with a historical three-dimensional datapoint is a result of a moving object rather than a static travel way feature. For example, the classification system can leverage depth information from the current three-dimensional segmentation to determine whether a clear line of sight through a historical three-dimensional datapoint exists. By way of example, if the clear line of sight through a historical three-dimensional datapoint exists, the classification system can flag the historical three-dimensional datapoint, thereby compensating for the negative effect occlusion can have in feature classification.

More particularly, the classification system can convert the three-dimensional points associated with each of the current three-dimensional datapoints and the historical three-dimensional datapoints from cartesian coordinates to a set of polar coordinates. For example, the set of polar coordinates can include one or more angular coordinates and/or depth coordinates. By way of example, the set of current polar coordinates can include a range, azimuth, and pitch angle.

For example, the classification system can determine a set of current polar coordinates for each current three-dimensional datapoint in the plurality of current three-dimensional datapoints. To do so, the classification system can convert the Cartesian coordinates defining a three-dimensional point corresponding to each current three-dimensional datapoint into polar coordinates. The set of current polar coordinates can include one or more angular coordinates and a depth coordinate. In addition, the classification system can determine a set of historical polar coordinates for historical three-dimensional datapoint in the plurality of representations of historical three-dimensional datapoints. To do so, the classification system can convert the Cartesian coordinates defining a three-dimensional point corresponding to each historical three-dimensional datapoint into polar coordinates. The set of historical polar coordinates can include one or more angular coordinates and a depth coordinate.

The classification system can determine the occlusion score for each of the plurality of representations of historical three-dimensional datapoints based on a comparison between a corresponding set of historical polar coordinates and a matching set of current polar coordinates. For example, the matching set of current polar coordinates can include a set of current polar coordinates with the same or similar angular coordinates as the corresponding set of historical polar coordinates. The classification system can identify the matching set of current polar coordinates by comparing the angular coordinates of each set of current polar coordinates with the corresponding historical polar coordinates corresponding to a historical three-dimensional datapoint. In this manner, the classification system can identify a pair of polar coordinates corresponding to a respective current three-dimensional datapoint and a respective historical three-dimensional datapoint associated with similar or matching angular coordinates.

The classification system can determine an occlusion score for each historical three-dimensional datapoint based on a difference in depth between the matching set of current polar coordinates and the corresponding set of historical polar coordinates corresponding to a respective historical three-dimensional datapoint. For example, the classification system can compute the difference in depth between the matching set of current polar coordinates and the corresponding set of historical polar coordinates. By way of example, the classification system can compute the difference in depth by subtracting the depth coordinate of the corresponding set of historical coordinates from the depth coordinate of the matching set of current polar coordinates. The classification system can determine the occlusion score for the historical three-dimensional datapoint corresponding to the corresponding set of historical polar coordinates based at least in part on the difference in depth. For example, in some implementations, the difference in depth is the occlusion score for the corresponding historical three-dimensional datapoint.

The classification system can determine and store the occlusion score for each of the plurality of representations of historical three-dimensional datapoints in the classification database. For example, as described above, the classification database can include a feature vector associated with each three-dimensional point of the classification database. The classification system can store the occlusion score for each historical three-dimensional datapoint in the classification database as part of the feature vector associated with the three-dimensional point corresponding to the historical three-dimensional datapoint. In some implementations, the classification system can update the occlusion score for each of the plurality of three-dimensional points of the classification database at each time step based on the current three-dimensional segmentation. For example, if a three-dimensional point of the classification database is associated with an occlusion score from a previous time step, the classification system can update the occlusion score with an occlusion score determined at the current time step. In this manner, the classification system can continuously remember, reinforce, and forget past three-dimensional datapoints based on the current three-dimensional segmentation for each time step.

The systems and methods described herein provide a number of technical effects and benefits, particularly in the areas of computing technology, vehicles, and the integration of computing technology in vehicles, such as in autonomous vehicles. In particular, example implementations of the disclosed technology provide improved techniques for identifying travel way features in the surrounding environment of a vehicle in real time. For example, utilizing the implementations of the disclosed technology, a computing system can increase the accuracy of high definition maps (and its motion planning/control based thereon) by accurately identifying map changes in real time due to events such as construction, temporary lane closures, lane repainting, and speed limit changes, etc. To do so, implementations of the disclosed technology employ a machine learned method configured to (1) remember past beliefs; (2) reinforce past beliefs; and (3) forget past beliefs based on new evidence. For instance, implementations of the disclosed technology increase the accuracy and reduce the computational cost of identifying static objects in real time by storing past observations in a nonparametric memory and, subsequently, updating past observations based on current observations. This allows implementations of the disclosed technology to create direct relationships between the past beliefs accumulated in memory and the new observations at each time step.

The implementations of the disclosed technology can exploit both two-dimensional and three-dimensional data to accurately detect objects in the surrounding environment of a vehicle. More particularly, implementations of the disclosed technology can leverage two-dimensional segmentation methods to detect objects based on two-dimensional data such as camera images. These observations can be fused with three-dimensional point cloud data provided by three-dimensional sensors to localize the objects in the third-dimension. In this manner, the systems and methods of the disclosed technology can increase the accuracy of two-dimensional classification systems. Moreover, the systems and methods of the disclosed technology can exploit the three-dimensional data for occlusion reasoning. For example, three-dimensional observations can be used by the systems and methods of the disclosed technology to decide whether previously observed objects should be reinforced or forgotten based on whether the object is not observed but occluded at a current time step or not observed or occluded at the current time step. In this manner, the systems and methods of the current disclosure can aggregate information in memory for better understanding of objects that are observed over time. Making use of occlusion reasoning at each time step, the systems and methods of the current disclosure effectively distinguishes and refines the decisions between the desire to forget and to remember. This, in turn, increases the accuracy and efficiency of identifying map changes in real time; thereby, increasing the safety and reliability of vehicles.

Example aspects of the present disclosure can provide a number of improvements to vehicle computing technology, such as autonomous vehicle computing technology. For instance, the systems and methods of the present disclosure provide an improved approach for identifying travel way features in the surrounding environment of a vehicle. For example, a computing system can obtain two-dimensional data depicting a surrounding environment of a vehicle and three-dimensional data associated with the surrounding environment. The computing system can provide the two-dimensional data as one or more inputs into a machine-learned segmentation model to receive a two-dimensional segmentation as one or more outputs of the machine-learned segmentation model. The computing system can generate a current three-dimensional segmentation based at least in part on the two-dimensional data, the three-dimensional data, and the two-dimensional segmentation. The computing system can store first data indicative of the current three-dimensional segmentation in a classification database that includes second data associated with one or more previously generated three-dimensional segmentations. The computing system can identify travel way features based on data stored in the classification database. For example, the computing system can identify the travel way features based at least in part on the current three-dimensional segmentation and the data indicative of a plurality of representations of historical three-dimensional datapoints. In this manner, the computing system employs a new kind of classification system that increases the efficiency, scalability, and accuracy of previous classification techniques. For example, the classification system can efficiently leverage accurate historical data by utilizing current observations to continuously update previously observed travel way features. Moreover, by utilizing a non-parametric memory rather than more a robust "canvas," the classification system can efficiently maintain a record of easily accessible segmented objects of interest (e.g., travel way features). In this manner, the classification system can accumulate and utilize newly available information such as, for example, the historical three-dimensional datapoints, current three-dimensional datapoints, occlusion scores, etc. to provide a practical improvement to autonomous vehicle technology; thereby, improving vehicle mapping systems in general by detecting and updating preconstructed maps with real time map changes.

Furthermore, although aspects of the present disclosure focus on application of the classification techniques described herein to vehicles, the systems and methods of the present disclosure can be used to classify objects in the surrounding environment of any object based on two-dimensional and three-dimensional data. Thus, for example, the systems and methods of the present disclosure can be used to localize a smartphone or other portable computing device by analyzing two-dimensional and three-dimensional data captured by the device relative to a database of three-dimensional datapoints (e.g., through the techniques described herein for occlusion reasoning, data fusion, etc.)

With reference now to the FIGS., example aspects of the present disclosure will be discussed in further detail. FIG. 1 illustrates an example vehicle computing system 100 according to example embodiments of the present disclosure. The vehicle computing system 100 can be associated with a vehicle 105. The vehicle computing system 100 can be located onboard (e.g., included on and/or within) the vehicle 105.

The vehicle 105 incorporating the vehicle computing system 100 can be various types of vehicles. In some implementations, the vehicle 105 can be an autonomous vehicle. For instance, the vehicle 105 can be a ground-based autonomous vehicle such as an autonomous car, autonomous truck, autonomous bus, etc. The vehicle 105 can be an air-based autonomous vehicle (e.g., airplane, helicopter, bike, scooter, or other aircraft) or other types of vehicles (e.g., watercraft, etc.). The vehicle 105 can drive, navigate, operate, etc. with minimal and/or no interaction from a human operator 106 (e.g., driver). An operator 106 (also referred to as a vehicle operator) can be included in the vehicle 105 and/or remote from the vehicle 105. Moreover, in some implementations, the vehicle 105 can be a non-autonomous vehicle.

The vehicle 105 can be configured to operate in a plurality of operating modes. For example, the vehicle 105 can be configured to operate in a fully autonomous (e.g., self-driving) operating mode in which the vehicle 105 is controllable without user input (e.g., can drive and navigate with no input from a vehicle operator present in the vehicle 105 and/or remote from the vehicle 105). The vehicle 105 can operate in a semi-autonomous operating mode in which the vehicle 105 can operate with some input from a vehicle operator present in the vehicle 105 (and/or a human operator that is remote from the vehicle 105). The vehicle 105 can enter into a manual operating mode in which the vehicle 105 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 105 can implement vehicle operating assistance technology (e.g., collision mitigation system, power assist steering, etc.) while in the manual operating mode to help assist the vehicle operator 106 of the vehicle 105. For example, a collision mitigation system can utilize information concerning travel way features within the vehicle's surrounding environment to help an operator avoid collisions even when in manual mode.

The operating modes of the vehicle 105 can be stored in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 100 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. For example, in some implementations, the remote computing system can be an operations computing system 190, as disclosed herein. By way of example, such data communicated to a vehicle 105 by the operations computing system 190 can instruct the vehicle 105 to enter into the fully autonomous operating mode. In some implementations, the operating mode of the vehicle 105 can be set onboard and/or near the vehicle 105. For example, the vehicle computing system 100 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 100 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for identifying travel way features.

The vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the vehicle 105 over one or more networks (e.g., via one or more wireless signal connections). For example, the communications system 120 can allow the vehicle computing system 120 to communicate with an operations computing system 190. By way of example, the operations computing system 190 can include one or more remote servers communicatively linked to the vehicle computing system 100. In some implementations, the communications system 120 can allow communication among one or more of the system(s) onboard the vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the vehicle 105 can include one or more vehicle sensor(s) 125, an autonomy computing system 130, one or more vehicle control systems 135, one or more positioning systems 150, and other systems, as described herein. One or more of these systems can be configured to communicate with one another via a communication channel. The communication channel can include one or more data buses (e.g., controller area network (CAN)), onboard diagnostics connector (e.g., OBD-II), and/or a combination of wired and/or wireless communication links. The onboard systems can send and/or receive data, messages, signals, etc. amongst one another via the communication channel.

As described in further detail with reference to FIG. 2, the vehicle sensor(s) 125 can be configured to acquire sensor data 140. This can include sensor data associated with the surrounding environment of the vehicle 105. For instance, the sensor data 140 can include two-dimensional data depicting the surrounding environment of the vehicle 105. In addition, or alternatively, the sensor data 140 can include three-dimensional data associated with the surrounding environment of the vehicle 105. For example, the sensor(s) 125 can be configured to acquire image(s) and/or other two- or three-dimensional data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of two-dimensional and/or three-dimensional capturing devices. The sensor data 140 can include image data, radar data, LIDAR data, and/or other data acquired by the vehicle sensor(s) 125. For example, the vehicle sensor(s) 125 can include a front-facing RGB camera mounted on top of the vehicle 105 and the sensor data 140 can include an RGB image depicting the surrounding environment of the vehicle 105. In addition, or alternatively, the vehicle sensor(s) 125 can include one or more LIDAR sensor(s) and the sensor data 140 can include one or more sparse sets of LIDAR measurements. Moreover, the vehicle 105 can also include other sensors configured to acquire data associated with the vehicle 105. For example, the vehicle 105 can include inertial measurement unit(s), wheel odometry devices, and/or other sensors.

In some implementations, the sensor data 140 can be processed to identify one or more travel way feature(s) within the surrounding environment of the vehicle 105. The travel way feature(s) can include any identifiable object within the surrounding environment of the vehicle. For example, the travel way features can include one or more small objects that are critical to safe driving, such as, for example, traffic cones, barrels, traffic signs, etc. The travel way feature(s) can be located in front of, to the rear of, to the side of the vehicle 105, etc. The sensor data 140 can be indicative of locations associated with the travel way feature(s) within the surrounding environment of the vehicle 105 at one or more times. The vehicle sensor(s) 125 can provide the sensor data 140 to the autonomy computing system 130 and/or the classification system 185.

In addition to the sensor data 140, the autonomy computing system 130 can retrieve or otherwise obtain map data 145. The map data 145 can provide static world representations about the surrounding environment of the vehicle 105. For example, in some implementations, a vehicle 105 can exploit prior knowledge about the static world by building very detailed maps (HD maps) that represent not only the roads, buildings, bridges, and landmarks, but also traffic lanes, signs, and lights to centimeter accurate three-dimensional representations. More particularly, map data 145 can include information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other data that provides information that assists the vehicle 105 in comprehending and perceiving its surrounding environment and its relationship thereto. As described in detail herein, the map data 145 can be updated by the classification system 185. For example, the classification system 185 can identify one or more travel way features not included in the map data 145. In some implementations, the vehicle computing system 100 can determine a vehicle route for the vehicle 105 based at least in part on the map data 145. For example, map data 145 can be used at runtime by one or more systems of the vehicle computing system 100 for localization, smart perception (e.g., knowing where to look), motion and behavior forecasting as well as motion planning.

The vehicle 105 can include a positioning system 150. The positioning system 150 can determine a current position of the vehicle 105. The positioning system 150 can be any device or circuitry for analyzing the position of the vehicle 105. For example, the positioning system 150 can determine a position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 100 and/or provided to a remote computing system. For example, the map data 145 can provide the vehicle 105 relative positions of the elements of a surrounding environment of the vehicle 105. The vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the vehicle 105 and determine a motion plan for controlling the motion of the vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the vehicle 105 according to the motion plan.

The vehicle computing system 100 (e.g., the autonomy computing system 130) can identify one or more objects that are proximate to the vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class); the uncertainties associated therewith, and/or other state information. The perception system 155 can provide the perception data 170 to the prediction system 160, the motion planning system 165, the classification system 185, and/or other system(s).

The prediction system 160 can be configured to predict a motion of the object(s) within the surrounding environment of the vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the vehicle 105 (e.g., due to an overriding factor). In some implementations, the motion plan 180 may define the vehicle's motion such that the vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the vehicle 105 (e.g., multiple times per second). Each new motion plan can describe a motion of the vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 100 can cause the vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the vehicle 105 to autonomously travel within the vehicle's surrounding environment.

As shown in FIG. 1, the vehicle computing system 100 can include a classification system 185. The classification system 185 can identify one or more travel way features within the surrounding environment of vehicle 105, as described in greater detail herein. In some implementations, the classification system 185 can be configured to operate in conjunction with the vehicle autonomy system 130. For example, the vehicle autonomy system 130 may assume that the map data 145 is accurate and up to date. However, this assumption can be violated in the real world due to events such as construction, temporary lane closures, lane repainting, speed limit changes, etc. The classification system 185 can utilize online reasoning about map changes to ensure safety of self-driving and manually driven vehicles so that they can account for these violations. More specifically, the classification system 185 can aggregate information in memory to form an understanding of objects that are observed over time. For example, the classification system 185 can remember, reinforce, and forget previous travel way observations based on new observations. In this manner, the classification system 185 can effectively distinguish and refine observed travel way features with the surrounding environment of the vehicle 105. The classification system 185 can be utilized as an online component to complement static world representations (e.g., map data 145) by detecting and remembering travel way features that should be superimposed on top of the static world representations. This, in turn, enables the vehicle autonomy system 130 to react to changes in the environment in a timely manner (e.g., when approaching a lane closure).

For example, the classification system 185 can send data (e.g., indicative of travel way features, map changes, etc.) to and receive data from the vehicle autonomy system 130. In some implementations, the classification system 185 can be included in or otherwise a part of a vehicle autonomy system 130. The classification system 185 can include software and hardware configured to provide the functionality described herein. In some implementations, the classification system 185 can be implemented as a subsystem of a vehicle computing system 100. Additionally, or alternatively, the classification system 185 can be implemented via one or more computing devices that are remote from the vehicle 105. Example classification system 185 configurations according to example aspects of the present disclosure are discussed in greater detail with respect to FIGS. 2-8.

The operator 106 can be associated with the vehicle 105 to take manual control of the vehicle, if necessary. For instance, in a testing scenario, a vehicle 105 can be periodically tested with controlled faults that can be injected into an autonomous vehicle's autonomy system 130. This can help the vehicle's response to certain scenarios. A vehicle operator 106 can be located within the vehicle 105 and/or remote from the vehicle 105 to take control of the vehicle 105 (e.g., in the event the fault results in the vehicle exiting from a fully autonomous mode in the testing environment).

Although many examples are described herein with respect to autonomous vehicles, the disclosed technology is not limited to autonomous vehicles. In fact, any object capable of collecting two- and/or three-dimensional data can utilize the technology described herein for identifying travel way features. For example, a non-autonomous vehicle may utilize aspects of the present disclosure to identify a travel way feature for an operator of the non-autonomous vehicle, notify the vehicle operator of the travel way feature, and take precautionary measures based on the identified travel way feature. Likewise, a smart phone with one or more cameras, a robot, augmented reality system, and/or another type of system can utilize aspects of the present disclosure to identify travel way features.

Figure 2:
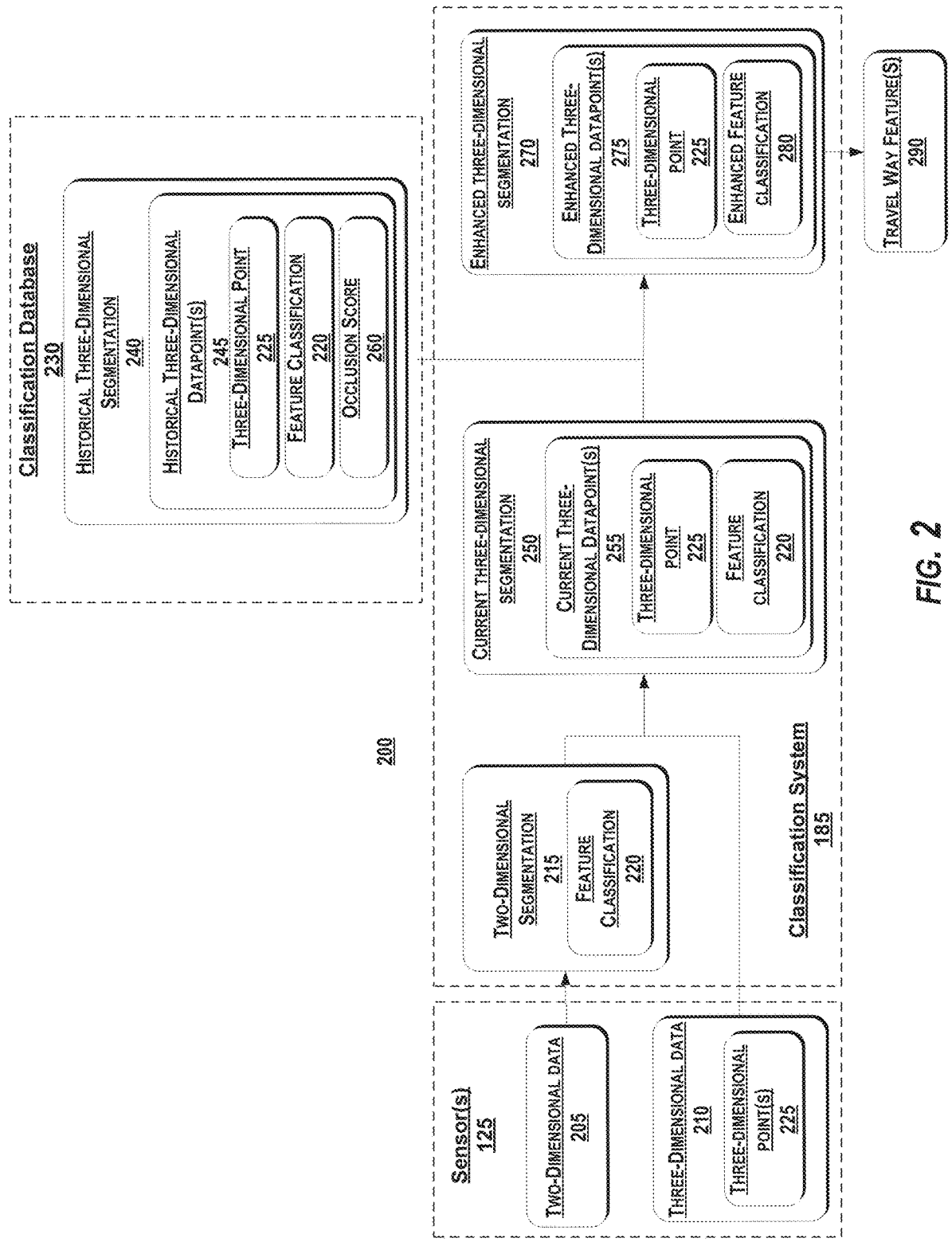
FIG. 2 depicts an example data flow diagram for identifying travel way features according to example implementations of the present disclosure.

FIG. 2 depicts an example data flow diagram 200 for identifying travel way features according to example implementations of the present disclosure. The classification system 185 can identify travel way feature(s) 290 based on two-dimensional data 205, three-dimensional data 210, and/or historical three-dimensional segmentation(s) 240. As discussed in greater detail below, the classification system 185 can receive two-dimensional data 205 and three-dimensional data 210 from one or more sensor(s) 125 onboard the vehicle. In addition, the classification system 185 can obtain data indicative of one or more historical three-dimensional segmentations 240 from a classification database 230 stored onboard the vehicle and/or remote from the vehicle in one or more remote servers.

More particularly, the classification system 185 can obtain two-dimensional data 205 depicting a surrounding environment of the vehicle. The two-dimensional data 205 can include any type of two-dimensional information, such as, for example, one or more pixels, texture elements, color elements, and/or coordinates associated with the surrounding environment of the vehicle. For instance, in some implementations, the two-dimensional data 205 can include a plurality of pixels forming an input image. The input image, for example, can be captured via one or more sensor(s) 125 (e.g., cameras) onboard the vehicle. By way of example, the sensor(s) 125 can include at least one front facing camera mounted to the vehicle. In some implementations, the front facing camera can include an RGB camera configured to capture one or more RBG images. The front facing camera can be configured to capture one or more images depicting the surrounding environment of the vehicle such as, for example, an environment in front of the vehicle.

The classification system 185 can obtain the two-dimensional data 205 from the one or more sensor(s) 125. For example, the classification system 185 can obtain a plurality of pixels forming an input image from one or more cameras onboard the vehicle. In addition, or alternatively, the classification system 185 can obtain an input image from the one or more sensor(s) 125 and analyze the input image to identify the two-dimensional data 205 (e.g., a plurality of pixels forming the input image). As described herein, the one or more pixels can include rich texture and color information that can be used to classify features within the surrounding environment of the vehicle.

In addition, the classification system 185 can obtain three-dimensional data 210 associated with the surrounding environment of the vehicle. The three-dimensional data 210 can include any information about the three-dimensional world surrounding the vehicle such as, for example, depth information, elevation information, etc. For example, in some implementations, the three-dimensional data 210 can include three-dimensional point cloud data. By way of example, the three-dimensional point cloud data can be indicative of LIDAR data captured by one or more sensor(s) 125. For example, the three-dimensional data 210 can include three-dimensional point cloud data indicative of LIDAR data captured via one or more LIDAR sensors onboard the vehicle.

The three-dimensional data 210 can include a plurality of three-dimensional points 225. For instance, the three-dimensional points 225 can be obtained from one or more LIDAR sensor sweeps. For example, one or more LIDAR measurements can provide a sparse set of three-dimensional points 225 per sensor sweep. The sparse set of three-dimensional points 225 can include three-dimensional coordinates localized in the three-dimensional world surrounding the vehicle. For example, in some implementations, the plurality of three-dimensional points 225 can include one or more three-dimensional Cartesian coordinates.

The classification system 185 can obtain a two-dimensional segmentation 215 based on the two-dimensional data 205. For example, the classification system 185 can utilize a two-dimensional segmentation method at any given time-step to detect one or more feature classifications depicted by two-dimensional data. By way of example, the two-dimensional segmentation 215 can be obtained based on the two-dimensional data 205 obtained at a current timestep. In some implementations, the classification system 185 can obtain a different two-dimensional segmentation at each timestep leading up to a current timestep. For example, each two-dimensional segmentation obtained at a respective time step can be based on two-dimensional data obtained at the respective time step.

The two-dimensional segmentation 215 can include one or more feature classification(s) 220. In some implementations, the two-dimensional segmentation 215 can include a pixel-wise segmentation on an input image. By way of example, the classification system 185 can assign one or more feature classification(s) 220 to a respective pixel of the input image based on the texture and color information associated with the respective pixel. The resulting two-dimensional segmentation 215 can include data indicative of one or more feature classifications 220 associated with one or more of the plurality of pixels forming the input image. In this manner, the two-dimensional segmentation 215 can identify one or more pixels of the plurality of pixels forming the input image that correspond to a feature of interest (e.g., travel way feature 290).

For example, each of the one or more feature classifications 220 can be indicative of a feature of interest such as, for example, a semantic travel way feature 290. In addition, or alternatively, each of the one or more feature classifications 220 can include a class-wise probability estimate. For example, each class-wise probability estimate can indicate the probability that a pixel corresponds to a particular feature of interest. A feature of interest can include any identifiable object within the surrounding environment of the vehicle. For example, a feature of interest can include traffic lanes, traffic lights, vehicles, pedestrians, etc. In some implementations, the one of more feature(s) of interest can include a semantic travel way feature 290. The travel way feature 290 can include one or more small objects that are critical to safe driving, such as, for example, traffic cones, barrels, traffic signs, etc. In addition, or alternatively, the semantic travel way features 290 can include features not included in a preconstructed map, such as, for example, new traffic signs, buildings, traffic lights, etc. In this manner, the classification system 185 can identify semantic travel way features 290 to enhance preconstructed maps with missing features.

The classification system 185 can generate a three-dimensional segmentation based at least in part on the two-dimensional data 205, the three-dimensional data 210, and/or the two-dimensional segmentation 215. To do so, the classification system 185 can exploit data fusion strategies to fuse the two-dimensional data 205, the three-dimensional data 210, and the two-dimensional segmentation 215. For example, the classification system 185 can fuse the two-dimensional segmentation 215 with the three-dimensional data 210 to localize the one or more feature classifications 220 of the two-dimensional segmentation 215 in three-dimensions for the current time step. By way of example, using a camera calibration matrix, the classification system 185 can project one or more three-dimensional point(s) 225 of the three-dimensional data 210 onto the two-dimensional data 205. For example, the classification database 185 can project the one or more three-dimensional point(s) 225 onto a plurality of pixels forming an input image. For each three-dimensional point 225 that falls within the input image, the classification system 185 can associate the feature classification 220 of the two-dimensional segmentation 215 at the nearest pixel of the input image with the three-dimensional point 225. Since LIDAR point clouds are relatively sparse, in implementations where the three-dimensional data 210 includes LIDAR point clouds, the classification system 185 can generate a three-dimensional segmentation by aggregating the segmentation result from a number of LIDAR sweeps.

In this manner, the classification system 185 can match a feature classification 220 associated with a respective pixel of the two-dimensional data 205 with a three-dimensional point 225 closest to the respective pixel. As a result, the three-dimensional segmentation can include data indicative of a plurality three-dimensional datapoints. The plurality of three-dimensional datapoints can include one or more feature classification(s) 225 localized in the three-dimensional world surrounding of the vehicle. For example, each of the plurality of three-dimensional datapoints can include a three-dimensional point 225 (e.g., one or more three-dimensional coordinates) and one or more feature classification(s) 220 corresponding to the three-dimensional point 225.

The classification system 185 can generate a three-dimensional segmentation at every time step up to a current time step. For example, the classification system 185 can generate a current three-dimensional segmentation 250 based on the two-dimensional data 205, the three-dimensional data 210, and the two-dimensional segmentation 215. The current three-dimensional segmentation 250 can include data indicative of a plurality of current three-dimensional datapoints 255. Each of the plurality of current three-dimensional datapoints 255 can include a three-dimensional point 225 and one or more feature classifications 220 associated with the three-dimensional point 225. For example, the current three-dimensional segmentation 250 can be indicative of a three-dimensional segmentation generated at a current time step. By way of example, the plurality of current three-dimensional datapoints 255 can include the most recently generated three-dimensional datapoints. In some implementations, the classification system 185 can identify one or more travel way features 290 based, at least in part, on the current three-dimensional segmentation 250. For example, the classification system 185 can identify one or more travel way features 290 by analyzing the one or more feature classifications 220 corresponding to each three-dimensional point 225 in the current three-dimensional segmentation 250.

In addition, or alternatively, the classification system 185 can generate an enhanced three-dimensional segmentation 270 based on historical information stored in a classification database 230. The classification database 230 can include second data associated with one or more previously generated three-dimensional segmentations. For instance, the second data can be indicative of one or more historical three-dimensional segmentation(s) 240. By way of example, a historical three-dimensional segmentation(s) 240 can include previously generated three-dimensional segmentations. The previously generated three-dimensional segmentations can include three-dimensional segmentations generated at one, some, or all time steps up to the current time step. For example, each historical three-dimensional segmentation 240 can include a plurality of representations of historical three-dimensional datapoints 245 and each of the plurality of representations of historical three-dimensional datapoints 245 can include a three-dimensional point 225 and one or more feature classifications 220 associated with the three-dimensional point 225.

Moreover, as described in greater detail with reference to FIG. 3, each of the plurality of representations of historical three-dimensional datapoints 245 can include an occlusion score 260. The occlusion score 260 can assess the validity of a feature classification 220 associated with a respective three-dimensional point 225. For example, the occlusion score 260 can identify whether or not past observed feature classifications 260 are occluded in the current frame (e.g., as depicted by the two-dimensional data 205). In this manner, if a previously observed point is no longer visible in the two-dimensional data 205 due to occlusion, the classification system 185 can remember the previous feature classification. Moreover, if the latest observation shows that a vehicle can see past the three-dimensional point 225 associated with a historical three-dimensional datapoint 245, the classification system can remove and/or reduce the probability that the feature classification 220 associated with a historical three-dimensional datapoint 245 is valid. In this way, the classification system 185 can exploit three-dimensional data 210 for occlusion reasoning. For example, the classification system 185 can utilize the current three-dimensional segmentation 250 as a soft-occlusion prior of the world to decide whether a previously observed travel way feature should not be updated at the current time step because it is occluded, or to forget about a previously observed object because it is not occluded and not observed at the current time step.

The classification system 185 can obtain the enhanced three-dimensional image segmentation 270 based on the current three-dimensional segmentation 250 and the data indicative of the historical three-dimensional segmentation(s) 240 of the classification database 230. The enhanced three-dimensional segmentation 270 can include a plurality of enhanced three-dimensional datapoints 275. Each of the plurality of enhanced three-dimensional datapoints 275 can include a three-dimensional point 225 and an enhanced feature classification 280 associated with the three-dimensional point 225. For example, as described in further detail with reference to FIG. 3, an enhanced feature classification 280 associated with a three-dimensional point 225 can include newly updated estimates for feature classification(s) 220 corresponding to the current three-dimensional datapoints 255 based on historical observations (e.g., the historical three-dimensional segmentations 240). The classification system 185 can identify one or more travel way features 290 based at least in part on the enhanced three-dimensional image segmentation 270. For example, the classification system 185 can identify one or more travel way features 290 by analyzing the one or more enhanced feature classifications 280 corresponding to each three-dimensional point 225 in the enhanced three-dimensional segmentation 270.

Figure 3:
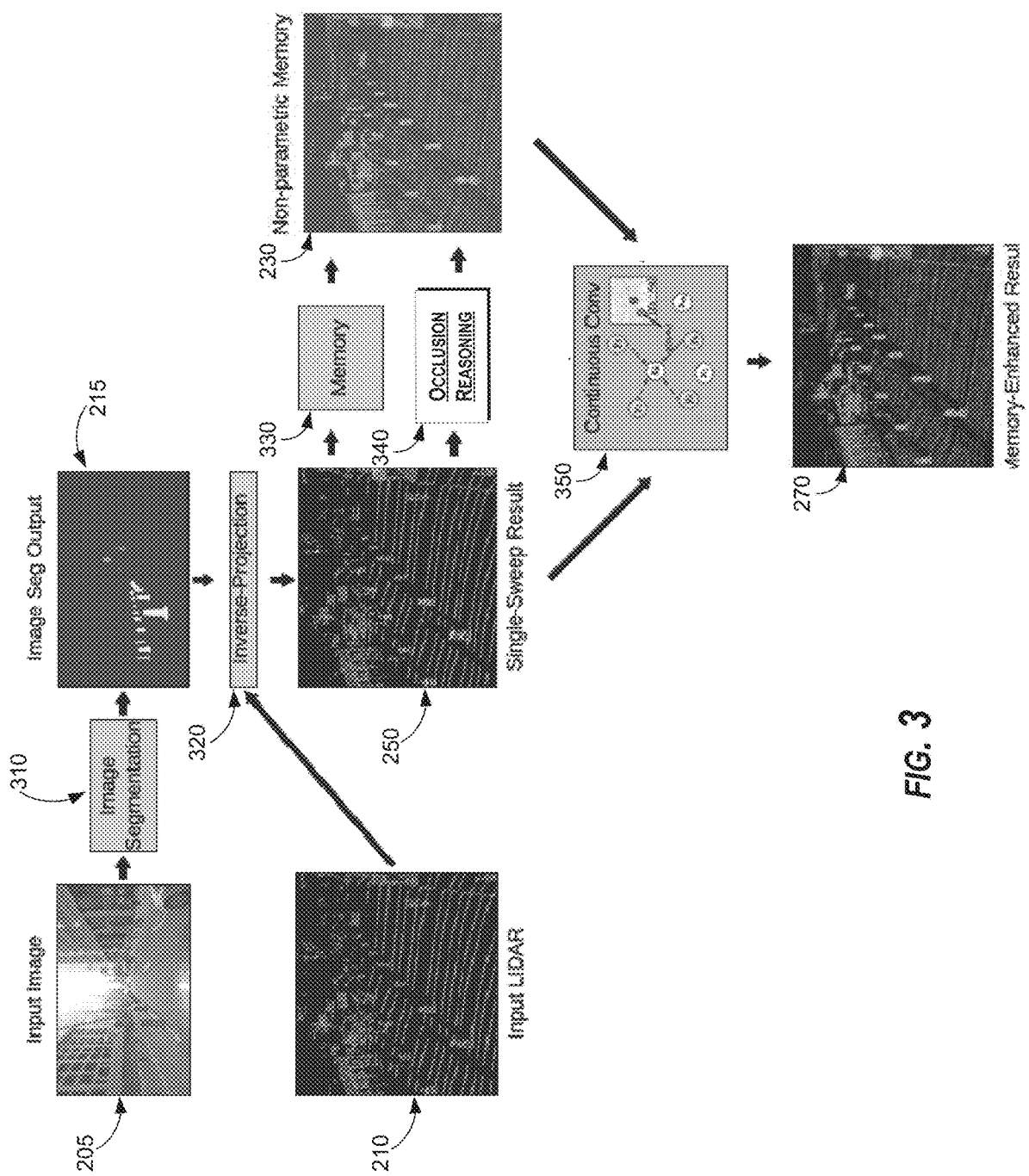
FIG. 3 depicts an example network diagram for identifying travel way features according to example implementations of the present disclosure.

Turning to FIG. 3, FIG. 3 depicts an example network diagram 300 for identifying travel way features according to example implementations of the present disclosure. In particular, FIG. 3 describes a non-parametric memory 230 representation that captures the local world around a vehicle. The representation can be configured to remember features that have been seen in the past and reinforce/forget its past feature classifications based on new evidence (e.g., current three-dimensional segmentation 250). Reinforcing past beliefs can increase the reliability of classification systems as computing systems can be uncertain the first time assigning a feature classification to a three-dimensional point (e.g., if the feature is heavily occluded or a range). Forgetting, on the other hand, can be desirable to remove false positives prevalent in feature classifications based on two-dimensional data.

To detect and build accurate feature classifications into memory, the classification system can take advantage of sensors such as two-dimensional and three-dimensional sensors that exist onboard vehicles (e.g., typical autonomous vehicle platforms). For example, the classification system can exploit cameras to segment classes of interest (e.g., travel way features such as construction elements, signs, etc.) and LIDAR to localize the classes of interest in three-dimensional space and for occlusion reasoning.

For example, the classification system can obtain two-dimensional data 205 depicting a surrounding environment of a vehicle and three-dimensional data 210 associated with the surrounding environment of the vehicle. The two-dimensional data 205 can include dense information (e.g., rich texture, color information, etc.) captured by a two-dimensional sensor such as a camera. This information can allow a machine-learned model to disambiguate between different types of surfaces that may otherwise have a similar physical structure. The classification system can leverage such machine-learned models to receive a two-dimensional segmentation 215 based on the information provided by the two-dimensional data 205.

By way of example, the classification system can provide the two-dimensional data 205 as one or more inputs into a machine-learned segmentation model 310 to receive the two-dimensional segmentation 215 as one or more outputs of the machine-learned segmentation model 310. The machine-learned segmentation model 310 can include one or more machine-learned models. For example, the machine-learned segmentation model 310 can include one or more neural networks such as one or more convolutional neural networks. In some implementations, the machine-learned segmentation model 310 can include a deep convolutional neural network using a ResNet-101 backbone. For instance, a variation of the PSPNet architecture can be used as it is effective in aggregating feature information over large receptive fields. In particular, the machine-learned segmentation model 310 can follow a standard ResNet-101 backbone's 2048-dimensional output with three large receptive field size pooling operations of 5×5, 10×10, and 25×25 followed by a point-wise convolution for the original output and all three pooling outputs to reduce the output dimension to 512 before concatenation. In some implementations, this process output can be processed by an additional 3 ResNet blocks to fuse multi-scale information. In addition, three transposed convolution layers with a ResNet block following the first two can be used to upsample the feature volume to input resolution while reducing the feature dimension.

The machine-learned segmentation model 310 can be trained, via one or more machine-learning techniques, on a dataset of input images annotated with ground truth feature classifications. The machine-learned segmentation model 310 can be trained to label (e.g., with a feature classification) one or more pixels forming an input image based on the texture and color information associated with the one or more pixels. The machine-learned segmentation model 310 can be trained to output feature classifications indicative of any class of object, such as, for example, construction objects, travel way objects, vehicle objects, building objects, environmental objects, etc.). For example, in some implementations, the machine-learned segmentation model 310 can be trained to classify construction and traffic sign classes. This can be beneficial for vehicles as it is relatively difficult for traditional classification approaches to detect such objects due to their small physical size.

Human labeling efforts of point-wise LIDAR point clouds is especially difficult, as complex sparse three-dimensional points are difficult to visualize and select. Thus, the machine-learned segmentation model 310 can employ a two-dimensional semantic segmentation model and aggregation for automatic ground truth generation. To this end, the machine-learned segmentation model 310 can be trained on a training dataset including training, validation, and testing data (e.g., two-dimensional data). For example, the training dataset can include two-dimensional data with pixel-wise semantic segmentation annotations. By way of example, the training dataset can include 10,000 training, 1,300 validation, and 1,300 testing images with pixel-wise semantic segmentation annotations collected in various North American cities and highways. The machine-learned segmentation model 310 can be trained on one or more graphics processing units. For example, the machine-learned segmentation model 310 can be trained on four NVIDIA Titan Xp GPUs with ADAM and a learning rate of 1e−5 until convergence at 240k iterations. In this manner, a training method for the machine-learned segmentation model 310 can achieve a 64.1% and 63.3% pixel-wise intersection over union on classes (e.g., sign and construction classes) in the validation set.

The machine-learned segmentation model 310 can be configured to output a two-dimensional segmentation 215 including one or more feature classifications based on the two-dimensional data 205. Accordingly, in some implementations, the classification system can pass the two-dimensional data 205 (e.g., an input image captured from a camera, a plurality of pixels, etc.) through the machine-learned segmentation model 310 to receive the two-dimensional segmentation 215. The resulting two-dimensional segmentation 215 can include two-dimensional data labeled with feature classifications indicative of one or more features of interest such as, for example, travel way features.

The classification system can generate a current three-dimensional segmentation 250 through inverse-projection 320 based on the two-dimensional segmentation 215 and the three-dimensional data 210. For example, the classification system can fuse the two-dimensional segmentation 215 with the three-dimensional data 210 to generate the current three-dimensional segmentation 250. By way of example, the feature classifications (e.g., pixel-wise labels) of the two-dimensional segmentation 215 can be re-projected 320 onto the three-dimensional data 210 captured at the same time as the two-dimensional data 205. In this manner, the current three-dimensional segmentation 250 can be generated based on a two-dimensional segmentation and three-dimensional data received at a current time step. The current three-dimensional segmentation 250 can represent a single sweep of fused two-dimensional data 205 and three-dimensional data 210. Using the current three-dimensional segmentation 250, the classification system can leverage the discerning power of the machine-learned segmentation model 310 while using three-dimensional data 210 accumulated over time as a localizer to segment the travel way features with high accuracy in three-dimensions. The classification system can use the resulting current three-dimensional segmentation 250 to identify travel way features in the surrounding environment of the vehicle.

In some implementations, the classification system can leverage historical observations to improve the accuracy of the current three-dimensional segmentation 250. For example, an enhanced three-dimensional segmentation 270 can compensate for the fact that segmentation results at shorter distances are usually less noisy than at longer distances by considering three-dimensional data differently when collected at different times. At the same time, the enhanced three-dimensional segmentation 270 can manage contradictory information between current and historical travel way observations. For example, the classification system can remove a feature classification from a previous three-dimensional datapoint of the enhanced three-dimensional segmentation when a clear line of sight to structures behind the datapoint are observed at a current time step. Thus, the enhanced three-dimensional segmentation can remove false positives, reduce noise, and correct misalignments and mislabeled regions inherent in a single sweep three-dimensional segmentation (e.g., the current three-dimensional segmentation 250).

The classification system can generate the enhanced three-dimensional segmentation 270 based on historical information stored in the classification database 230. For example, the classification system can access a classification database communicatively coupled to the classification system. By way of example, the classification database 230 can be stored in memory onboard the vehicle, in one or more remote servers communicatively coupled to the vehicle, etc. For example, in some implementations, the classification database 230 can be located on or more remote servers, such as, for example, an operations computing system. In such a case, the classification system can access the classification database 230 via one or more communication interfaces onboard the vehicle.

The classification database 230 can include a non-parametric memory configured to maintain a record of three-dimensional datapoints corresponding to features of interest. For example, the non-parametric memory can include a stored representation of three-dimensional datapoints corresponding to features of interest. The stored representation can be updated by the classification system to reflect the latest observations to remember previous information, increase estimation confidence, or remove false positives as applicable. More particularly, the classification database 230 can include data indicative of a plurality of three-dimensional datapoints. For example, the classification database 230 can include a plurality of three-dimensional points indicative of one or more three-dimensional Cartesian coordinates. By way of example, the classification database 230 can include a three-dimensional point for every three-dimensional datapoint in the plurality of three-dimensional datapoints. For instance, the classification database 230 can use a non-parametric memory structure to maintain a current best estimate for segmentation of aggregated three-dimensional points.

In some implementations, the classification database 230 can include a list of each of the one or more three-dimensional points as described by their respective cartesian coordinates. In particular, the classification database 230 can include a length N list of three-dimensional points described by an $\mathbb{R}^3$ coordinate. In addition, the classification database 230 can include a feature vector corresponding to each three-dimensional point. In some implementations, each feature vector can include feature classifications associated with a respective three-dimensional point at all time steps up to the current time. For example, in some implementations, the classification database 230 can include a feature vector $M \in [0,1]^C$ of C associated feature classifications (e.g., class-wise probability estimates) for each three-dimensional point indexed by i collected at all time steps up to the current time.

In some implementations, a feature vector corresponding to a respective three-dimensional point can include additional features associated with the respective three-dimensional point. For example, each feature vector can include data indicative of at least one of a feature classification, occlusion score, LIDAR intensity, and/or vehicle distance corresponding to the respective three-dimensional point. By way of example, a feature vector can include data indicative of an occlusion score assessing the validity of a feature classification associated with the respective three-dimensional point. Moreover, in some implementations, a feature vector can include relevant sensor information such as an intensity of the LIDAR measurement associated with the respective three-dimensional point, a distance to the vehicle at which a respective three-dimensional point was measured, etc.

In some implementations, the classification database 230 can include a graph of three-dimensional points. For example, the classification database 230 can include a dynamic size graph containing three-dimensional points. In some implementations, each of the three-dimensional points of the dynamic size graph can be identified as likely to correspond to one or more features of interest (e.g., travel way features) observed in the past. In addition, the dynamic graph can include segmentations (e.g., feature classifications) processed on the two-dimensional data corresponding to each three-dimensional point. The classification database 230 can define a dynamic graph based on a spatial relationship between each of the plurality of three-dimensional points in the classification database 230. For example, the plurality of three-dimensional points can represent a plurality of nodes of the dynamic graph. Each respective node can include a set of edges connecting the respective node to other nodes in the dynamic graph. In some implementations, the set of edges can be defined based on a spatial relationship between the plurality of three-dimensional points. By way of example, the set of edges for each respective node can include the K-nearest spatial neighbors to the three-dimensional point corresponding to the respective node. More particularly, in some implementations, the classification database 230 can define a graph G=(P, E) where P is the set $\{u\}$ of all historical and current three-dimensional points, and E is the set of edges $\{(u) | v \, NN_K(u)\}$, where the $NN_K(u)$ returns the K-nearest spatial neighbors to a point u.

As noted in FIG. 2, the classification database 230 can include second data indicative of one or more historical observations. For instance, the classification database 230 can include second data associated with one or more previously generated three-dimensional segmentations. For example, the second data can be indicative of the plurality of representations of historical three-dimensional datapoints associated with the one or more previously generated three-dimensional segmentations (e.g., historical three-dimensional segmentations). For example, in some implementations, the classification database can include a non-parametric memory indicative of the plurality of representations of historical three-dimensional datapoints associated with the one or more previously generated three-dimensional segmentations (e.g., historical three-dimensional segmentations). More particularly, the classification database 230 can include a three-dimensional point for each historical three-dimensional datapoint in the plurality of representations of historical three-dimensional datapoints and a feature vector corresponding to each three-dimensional point. In some implementations, the classification database 230 can include data indicative of historical three-dimensional datapoints corresponding to one or more features of interest. For example, the classification database 230 can include a plurality of three-dimensional points associated with a feature classification corresponding to one or more travel way features.

In addition, in some implementations, the classification database 230 can include data indicative of a plurality of current three-dimensional datapoints associated with the current three-dimensional segmentation 250. For example, as discussed in further detail below, the classification system can store data indicative of the plurality of current three-dimensional datapoints in the classification database 250. In this way, the dynamic graph of the classification database 230 can vary in size at each time step as three-dimensional points can be deleted and new three-dimensional points can arrive with new three-dimensional data at each time step.

The classification system can aggregate information stored in the classification database 230 through occlusion reasoning 340. More particularly, in some implementations, the classification system can remember, reinforce, or forget feature classifications associated with the plurality of representations of historical three-dimensional datapoints in the classification database 230 through occlusion reasoning 340. To do so, the classification system can determine an occlusion score for each of the plurality of representations of historical three-dimensional datapoints in the classification database 230 based at least in part on the current three-dimensional segmentation 250. The occlusion score, for example, can include a probability that a feature classification associated with a historical three-dimensional datapoint is valid and/or if it represents a false positive. A false positive, for example, can result from occlusion, classifying a moving object rather than a static feature, and/or varying distances at previous time steps and/or current time steps.

The classification system can determine the occlusion score for each historical three-dimensional point by leveraging depth information from the current three-dimensional segmentation 250. For example, the classification system can leverage depth information from the current three-dimensional segmentation 250 to determine whether a clear line of sight to a historical three-dimensional datapoint exists at the current time step. If a clear line of sight to a historical three-dimensional datapoint exists, the classification system can determine an occlusion score indicative of reinforcing the data indicative of the historical three-dimensional datapoint. If a clear line of sight to a historical three-dimensional datapoint does not exist, the classification system can determine an occlusion score indicative of remembering or forgetting the data indicative of the historical three-dimensional datapoint.

For example, the classification system can determine an occlusion score indicative of remembering data indicative of the historical three-dimensional datapoint in the classification database when there is not a clear line of sight to the historical three-dimensional datapoint at the current time step. This can indicate, for example, that the historical three-dimensional datapoint is occluded at the current time step. In addition, or alternatively, the classification system can determine an occlusion score indicative of forgetting data indicative of the historical three-dimensional datapoint in the classification database when there is a clear line of sight through the historical three-dimensional datapoint at the current time step. This, for example, can indicate that the historical three-dimensional datapoint is not occluded and not observed at the current time step. In such a case, in some implementations, the classification system can remove the data indicative of the historical three-dimensional datapoint from the classification database. In this manner, the classification system can continuously update the classification database with accurate three-dimensional datapoints.

More particularly, in some implementations, the classification system can compute occlusion information from the current frame (e.g., two-dimensional segmentation 250) by constructing a dense depth map for the current time step. The classification system can use the vehicle pose at each time step to convert the three-dimensional points associated with each of the current three-dimensional datapoints and the historical three-dimensional datapoints to a set of polar coordinates in the current perspective reference frame. For example, the set of polar coordinates can include one or more angular coordinates and/or depth coordinates. Moreover, in some implementations, the set of current polar coordinates can include a range, azimuth, and pitch angle. In some cases, the density of LIDAR points can vary with distance. Density is constant, however, in polar coordinates as pitch (vertical) angular separation of LIDAR beams and the azimuth (horizontal) angular resolution are constant. Thus, the classification system can effectively compare the three-dimensional points through time by converting each three-dimensional point to a set of polar coordinates.

For example, the classification system can determine a set of current polar coordinates for each current three-dimensional datapoint in the plurality of current three-dimensional datapoints. To do so, the classification system can convert Cartesian coordinates defining a three-dimensional point corresponding to each current three-dimensional datapoint into a set of polar coordinates. The set of current polar coordinates can include one or more angular coordinates and a depth coordinate. In addition, the classification system can determine a set of historical polar coordinates for each three-dimensional datapoint in the plurality of representations of historical three-dimensional datapoints. To do so, the classification system can convert Cartesian coordinates defining a three-dimensional point corresponding to each historical three-dimensional datapoint into a set of polar coordinates. The set of historical polar coordinates can include one or more angular coordinates and a depth coordinate.

More particularly, for each three-dimensional point's coordinates $p=[x,y,z]^T$ where the x, y, z axis point in the forward, right, and up directions from the vehicle perspective, respectively, the three-dimensional point's polar coordinates can be computed as:

$$r = \sqrt{x^2 + y^2 + z^2}, \phi = \tan^{-1}\frac{y}{x}, \theta = \sin^{-1}\frac{z}{r}$$

where r, $\phi$, $\theta$ are the range, azimuth, and pitch angles, respectively. The remaining gaps can be filled in with nearest neighbor interpolation.

The classification system can determine the occlusion score for each of the plurality of representations of historical three-dimensional datapoints based on a comparison between a corresponding set of historical polar coordinates and a matching set of current polar coordinates. For example, the matching set of current polar coordinates can include a set of current polar coordinates with the same or similar angular coordinates as the corresponding set of historical polar coordinates. The classification system can identify the matching set of current polar coordinates by comparing the angular coordinates of each set of current polar coordinates with the corresponding historical polar coordinates corresponding to a historical three-dimensional datapoint. In this manner, the classification system can identify a pair of polar coordinate sets corresponding to a respective current three-dimensional datapoint and a respective historical three-dimensional datapoint associated with similar or matching angular coordinates.

The classification system can determine the occlusion score for each historical three-dimensional datapoint based on a difference in depth between the matching set of current polar coordinates and the corresponding set of historical polar coordinates corresponding to a respective historical three-dimensional datapoint. For example, the classification system can compute the difference in depth between the matching set of current polar coordinates and the corresponding set of historical polar coordinates. By way of example, the classification system can compute the difference in depth by subtracting the depth coordinate of the corresponding set of historical polar coordinates from the depth coordinate of the matching set of current polar coordinates. More specifically, the classification system can produce an occlusion score for each of the historical three-dimensional datapoints by computing the difference in depth:

$$O_p = r_{depth\ image,p} - r_p$$

where $r_p$ is the distance to a previous three-dimensional point queried and $r_{depth\ image,p}$ is the value in the depth image corresponding to the same angular coordinates as the query point. The classification system can determine the occlusion score for the historical three-dimensional datapoint corresponding to the corresponding set of historical polar coordinates based at least in part on the difference in depth. For example, in some implementations, the difference in depth can be assigned as the occlusion score for the corresponding historical three-dimensional datapoint.

The classification system can determine and store the occlusion score for each of the plurality of representations of historical three-dimensional datapoints in the classification database 230. For example, as described above, the classification database 230 can include a feature vector associated with each three-dimensional point of the classification database 230. The classification system can store the occlusion score for each historical three-dimensional datapoint in the classification database 230 as part of the feature vector associated with the three-dimensional point corresponding to each historical three-dimensional datapoint. In some implementations, the classification system can update the occlusion score for each of the plurality of three-dimensional points of the classification database 230 at each time step based on the current three-dimensional segmentation 250. For example, if a three-dimensional point of the classification database 230 is associated with an occlusion score from a previous time step, the classification system can update the occlusion score with an occlusion score determined at the current time step. In this manner, the classification system can continuously remember, reinforce, and forget past three-dimensional datapoints based on the current three-dimensional segmentation 250 for each time step.

Moreover, in some implementations, the classification database 230 can be updated 330 with data indicative of one or more current three-dimensional datapoints of the current three-dimensional segmentation 250. For example, the classification system can access the classification database 230 to store 330 first data indicative of the current three-dimensional segmentation 250 in the classification database 230. For instance, the classification system can access the classification database 230 via one or more communication interfaces onboard the vehicle and store the first data indicative of the current three-dimensional image segmentation 250 in the classification database 230 via the one or more communication interfaces. More particularly, the classification system can store data 330 indicative of the plurality of current three-dimensional datapoints of the current three-dimensional segmentation 250. By way of example, in some implementations, the classification system can store 330 the three-dimensional point corresponding to each of the plurality of current three-dimensional datapoints in the classification database 230 as a part of the list of one or more three-dimensional points.

In addition, or alternatively, the classification system can store 330 the feature classification corresponding to each three-dimensional point of the current three-dimensional segmentation 250 in a feature vector of the classification database 230 that corresponds to the three-dimensional point. In some implementations, the classification system can store 330 information for each three-dimensional point in the classification database 230. For example, in some implementations, the classification system can concatenate the memory contents, the occlusion score, intensity of the LIDAR measurement, and the distance to the vehicle at which each point was measured. This can result in a D=C+3 dimensional feature vector f for each three-dimensional point in the classification database 230.

The classification system can obtain the enhanced three-dimensional segmentation 270 based on the data indicative of the plurality of three-dimensional datapoints of the classification database 230. To do so, the classification system can identify a plurality of datapoint sets from the classification database 230. Each of the plurality of datapoint sets can include one or more three-dimensional points from the classification database 230 and a feature vector corresponding to each of the one or more three-dimensional points. For example, the classification system can identify each of the plurality of datapoint sets based on a spatial relationship between each three-dimensional point in the classification database 230. For instance, each datapoint set can include a respective three-dimensional point from the classification database 230 and a 50 K-nearest spatial neighbors associated with the respective three-dimensional point.

In some implementations, the classification system can identify a datapoint set for each three-dimensional point in the classification database 230. By way of example, for each point $u_i$, the classification system can find its K=50 nearest neighbor coordinates $\{v_j\}$ and look up their features $f_j$. The classification system can give this information as input to a machine learned model.

For example, the classification system can provide each of the plurality of datapoint sets as an input into a machine-learned enhancing model 350 to receive the enhanced three-dimensional segmentation 270. The machine-learned enhancing model 350 can include one or more machine-learned models configured to output an enhanced three-dimensional image segmentation 270. For example, the machine-learned enhancing model 350 can include one or more neural networks (e.g., one or more continuous convolutional models). By way of example, in some implementations, the machine-learned enhancing model 350 can form an end-to-end neural network with the machine-learned segmentation model 310. For instance, in some implementations, the machine-learned enhancing model 350 can include a continuous convolutional model consisting of four layers with residual connections. The four layer continuous convolutional model can be, in some implementations, connected to the machine-learned segmentation model 310.

The classification system can use a machine-learned enhancing model 350 based on the continuous convolutions (CC) architecture to process each three-dimensional point of the classification database 230 based on a datapoint set associated with each three-dimensional point. In some implementations, a continuous convolution method can be used to allow input and queried output locations at arbitrary continuous coordinates. This, in turn, can bypass the need to balance between the high memory requirements of a voxelized representation needed by discrete convolutions and the resolution (e.g., precision) in the output space. The machine-learned enhancing model 350 can be implemented by any number of machine-learning techniques, architectures, or methods in order to generate an enhanced three-dimensional segmentation such as the enhanced three-dimensional segmentation 270.

In example implementations, the classification system can provide each datapoint set as input to the machine-learned enhancing model 350 including a continuous convolution model with four layers with residual connections. For each layer, N can be defined as the number of three-dimensional points, and F and O can be defined as the input and output feature dimensions, respectively. The enhanced three-dimensional segmentation 270 can be computed, based on the plurality of datapoint sets, as:

$$h_{k,i} = \sum_{d}^{F} \sum_{j}^{K} g_{d,k}(u_i - v_j) f_{d,j}$$

where $g=MLP(z; \theta): \mathbb{R}^3 \rightarrow \mathbb{R}$ is a learned multi-layer perceptron with parameters $\theta$ that transforms a spatial offset z into a scalar weight.

In some implementations, the first continuous convolutional layer can expand the feature dimensionality to 16, while the remaining layers maintain this dimensionality to produce a C dimensional classification output. Within each layer, an efficient and equivalent variant of the aforementioned continuous convolutional operation can be used. For example, a two-layer multi-layer perceptron can generate kernels based on the relative coordinate offsets between a queried point and its neighbors. This can be multiplied by point-wise features transformed by a learned projection, added to the input for the residual connection, and passed to the next layer. Moreover, in some implementations, batch normalization can be applied at the output of each continuous convolutional layer.

The machine-learned enhancing model 350 can be trained, via one or more machine-learning techniques, on a dataset of two-dimensional and three-dimensional data annotated with ground truth feature classifications. For example, the machine-learned enhancing model 350 can be trained over a joint three-dimensional and two-dimensional enhanced training dataset. By way of example, the enhanced training set can include a joint LIDAR and camera images dataset consisting of 3141 training, 430 validation, and 606 testing sequences of LIDAR sweeps and associated RGB front camera images. Each sequence can be defined by a key frame and can contain frames sampled at 0.5 meters of vehicle displacement (or 0.1 seconds if the vehicle moves farther between frames than 0.5 meters). In addition, each sequence can include frames prior to the key frame sampled over a displacement of 30 meters. In some implementations, this can enable training of the memory system. The locations of the three-dimensional points can be expressed in a globally consistent coordinate system by means of an online pose estimation system.

The data sequence can be extended with observations for 100 meters with the aforementioned sampling strategy. For each frame, the LIDAR points can be registered against the two-dimensional segmentation result. In some implementations, only three-dimensional datapoints within 25 meters of the vehicle can be selected to reduce three-dimensional to two-dimensional projection noise. In addition, or alternatively, in some implementations, a denoising step can be performed using the segmented and aggregated LIDAR point clouds as input with density-based spatial clustering. In this manner, a training sample/ground truth pair can be generated based on the sequence of frames preceding the key frame, while removing the distance filter. The denoised ground truth results can be used to label the enhanced training dataset with k-nearest neighbor search for three-dimensional points that are not within the denoised ground truth set.

In some implementations, each sequence of LIDAR frames sampled over the previous 30 meter driving distance can be normalized and input into the machine-learned enhancing model 350. For example, a sample mean and variances for the C+3=6 point-wise features can be estimated and normalized relative to each other. This can be input into the machine-learned enhancing model 350. The model parameters can be randomly initialized and, at the output, the average of the standard cross-entropy loss at each point can be minimized. The machine-learned enhancing model 350 can be trained with a batch size of 1 and the ADAM optimizer with a learning rate of 1e−3 on a single NVIDIA Titan Xp GPU until convergence as determined by the validation set of the enhanced training dataset at 28,000 iterations. In addition, the batch normalization statistics can be fixed, and the machine-learned enhancing model 350 can be finetuned at a learning rate of 1e−4 for an additional 64,000 iterations until convergence.

In this manner, the machine-learned enhancing model 350 can be trained to output an enhanced feature classification for a three-dimensional point based at least in part on a datapoint set corresponding to the three-dimensional point. The machine-learned enhancing model 350 can output an enhanced three-dimensional segmentation 270 based at least in part the enhanced feature classification for each three-dimensional point in the classification database 230. Thus, the enhanced three-dimensional segmentation 270 can include a plurality of enhanced three-dimensional datapoints. Each of the plurality of enhanced three-dimensional datapoints can include a three-dimensional point and an enhanced feature classification associated with the three-dimensional point. The classification system can identify one or more travel way features based at least in part on the enhanced three-dimensional image segmentation 270.

Figure 4:
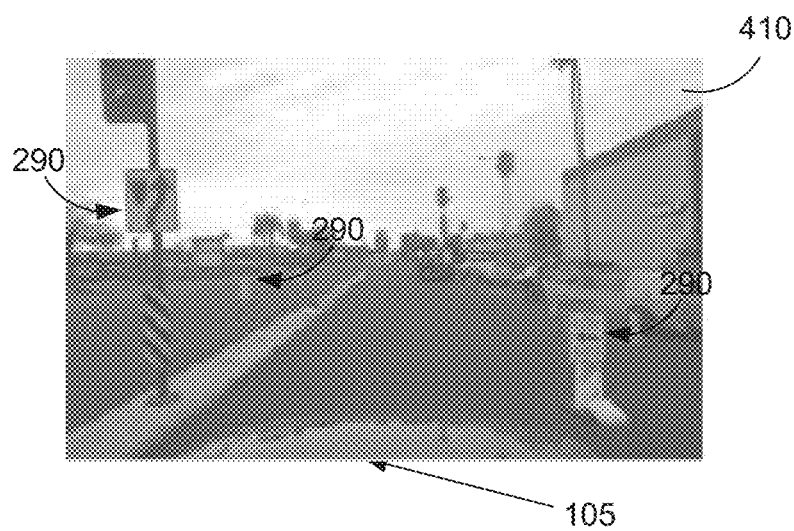
FIG. 4 depicts an example environment according to example implementations of the present disclosure.
Figure 4:
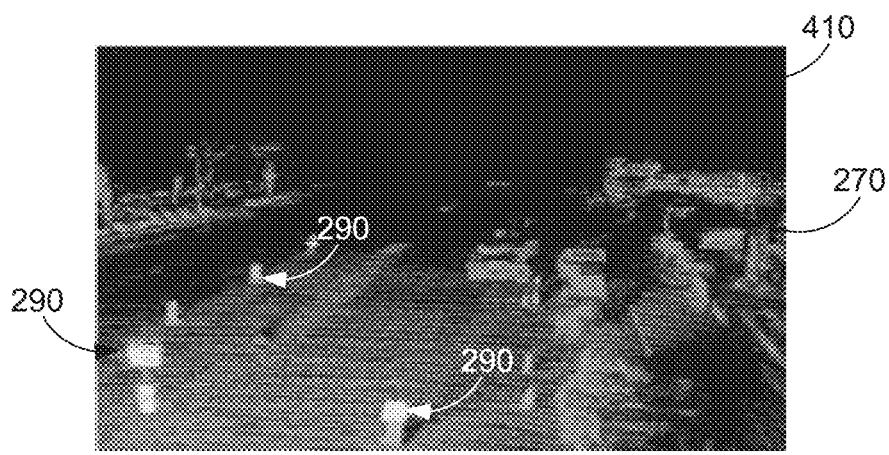

By way of example, FIG. 4 depicts an example surrounding environment according to example implementations of the present disclosure. The surrounding environment 410 of the vehicle 105 can include one or more travel way features 290. The enhanced three-dimensional segmentation can identify each of the one or more travel way feature(s) 290 in three-dimensional space surrounding the vehicle. The classification system can utilize the enhanced three-dimensional segmentation to detect the one or more travel way features 290 in the surrounding environment 410 of the vehicle 105. In this manner, the classification system can improve vehicle mapping systems by detecting and updating preconstructed maps with real time travel way features 290.

Figure 5:
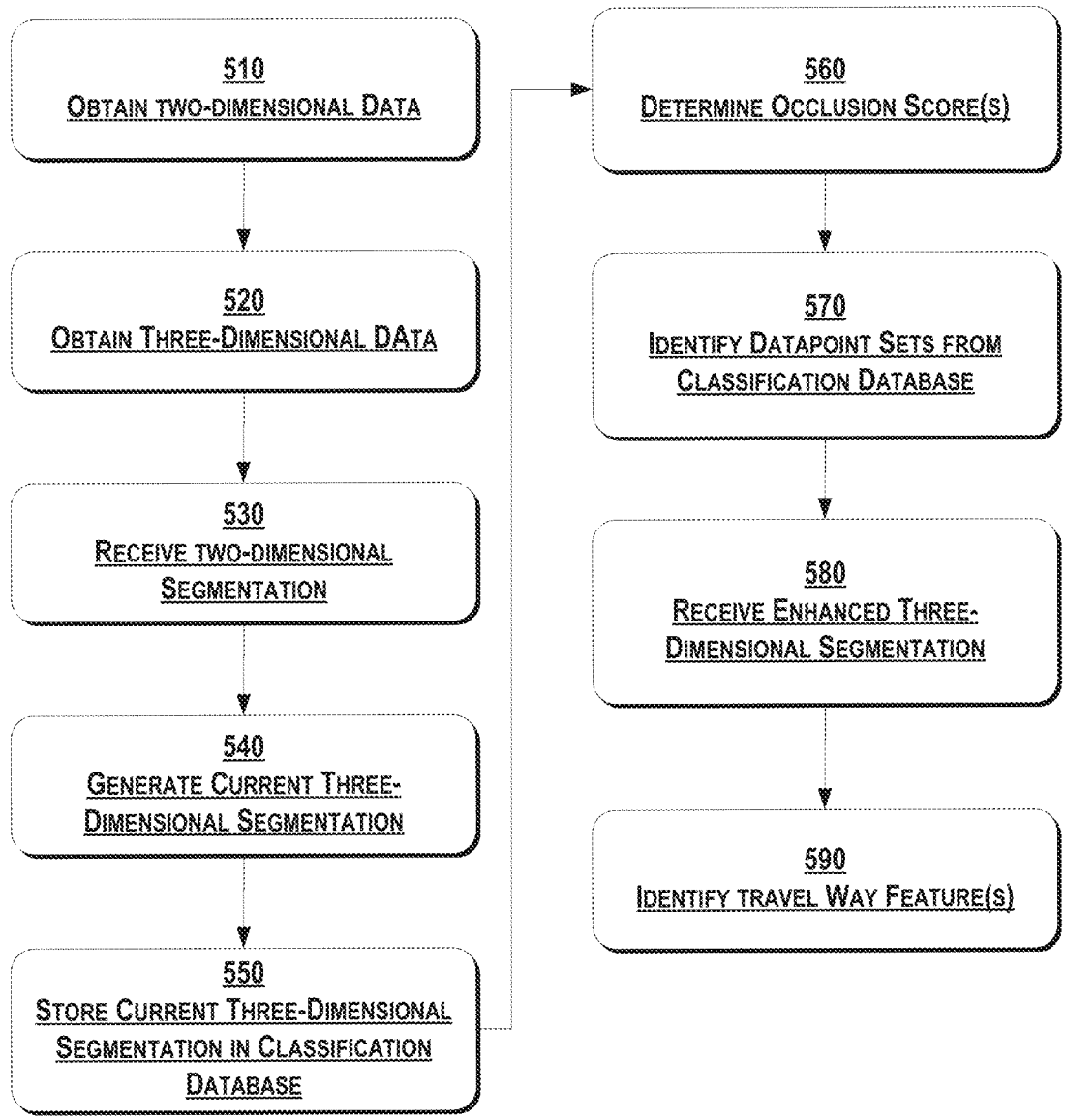
FIG. 5 depicts a flowchart diagram of an example method for identifying travel way features according to example implementations of the present disclosure.

FIG. 5 depicts a flowchart diagram of an example method 500 for identifying roadside features according to example implementations of the present disclosure. One or more portion(s) of the method 500 can be can be implemented by a computing system that includes one or more computing devices such as, for example, the computing systems described with reference to the other figures (e.g., the vehicle computing system 100, the classification system 185, the operations computing system 190, etc.). Each respective portion of the method 500 can be performed by any (or any combination) of one or more computing devices. Moreover, one or more portion(s) of the method 500 can be implemented as an algorithm on the hardware components of the device(s) described herein (e.g., as in FIGS. 1 and/or 8), for example, to allow a vehicle to identify travel way features in real time within its surrounding environment. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 5 is described with reference to elements/terms described with respect to other systems and figures for example illustrated purposes and is not meant to be limiting. One or more portions of method 500 can be performed additionally, or alternatively, by other systems.

At (510), the method 500 can include obtaining two-dimensional data. For example, a classification system can obtain two-dimensional data from one or more sensors onboard a vehicle. The two-dimensional data can depict the surrounding environment of the vehicle. In some implementations, the two-dimensional data can include a plurality of pixels forming an input image. For example, the two-dimensional data can include one or more pixels forming an input image captured via one or more cameras onboard the vehicle.

At (520), the method can include obtaining three-dimensional data. For example, the classification system can obtain three-dimensional data from one or more sensors onboard a vehicle. The three-dimensional data can be associated with the surrounding environment of the vehicle. For example, the three-dimensional data can include one or more three-dimensional points associated with the surrounding environment of the vehicle. In some implementations, the three-dimensional data can include three-dimensional point cloud data. For example, the three-dimensional data can include three-dimensional point cloud data indicative of LIDAR data. By way of example, the three-dimensional data can include three-dimensional point cloud data indicative of LIDAR data captured via one or more LIDAR sensors onboard the vehicle.

At (530), the method can include receiving a two-dimensional segmentation. For example, the classification system can input the two-dimensional data into a machine-learned segmentation model to receive the two-dimensional segmentation as an output of the machine-learned segmentation model. The two-dimensional segmentation can include one or more feature classification(s) associated with the two-dimensional data. For example, in some implementations, the two-dimensional segmentation can include data indicative of one or more classifications associated with one or more of a plurality of pixels forming an input image.

The one or more feature classifications can be indicative of one or more features of interest such as, for example, a semantic travel way feature. A feature of interest, for example, can include any identifiable object within the surrounding environment of the vehicle. For example, a feature of interest can include traffic lanes, traffic lights, vehicles, pedestrians, etc. In some implementations, the one of more feature(s) of interest can include a semantic travel way feature including one or more small objects that are critical to safe driving, such as, for example, traffic cones, barrels, traffic signs, etc. In addition, or alternatively, the semantic travel way features can include features not included in a preconstructed map, such as, for example, new traffic signs, buildings, traffic lights, etc.

At (540), the method can include generating a current three-dimensional segmentation. For example, the classification system can generate the current three-dimensional segmentation based at least in part on the three-dimensional data and the two-dimensional segmentation. By way of example, the classification system can generate the current three-dimensional segmentation by fusing the two-dimensional data, the three-dimensional data, and/or the two-dimensional segmentation. In some implementations, the current three-dimensional segmentation can include data indicative of a plurality of current three-dimensional datapoints. For example, each of the plurality current three-dimensional datapoints can include a three-dimensional point and one or more feature classifications associated with the three-dimensional point. In some implementations, each three-dimensional point can include one or more cartesian coordinates.

At (550), the method can include storing the current three-dimensional segmentation in a classification database. For example, the classification system can store first data indicative of the current three-dimensional segmentation in the classification database. The classification database can include second data associated with one or more previously generated three-dimensional segmentations. For example, the second data can be indicative of a plurality of representations of historical three-dimensional datapoints associated with one or more previously generated three-dimensional segmentations. For example, each historical three-dimensional datapoint in the plurality of representations of historical three-dimensional datapoints can include a three-dimensional point. In addition, or alternatively, each of the plurality of representations of historical three-dimensional datapoints can include a three-dimensional point and one or more feature classifications associated with the three-dimensional point. The classification database can include the three-dimensional point for each historical three-dimensional datapoint in the plurality of representations of historical three-dimensional datapoints and the feature vector corresponding to each three-dimensional point. The feature vector corresponding to each three-dimensional point can include data indicative of at least one of a feature classification, occlusion score, LIDAR intensity, or vehicle distance corresponding to a respective three-dimensional point.

In some implementations, the classification database can define a dynamic graph based on a spatial relationship between each of a plurality of three-dimensional points. For example, each of the plurality of three-dimensional points can form a node of the dynamic graph. In some implementations, the dynamic graph can define a set of edges corresponding to each node. For example, each set of edges can include a set of spatially close three-dimensional points. By way of example, the set of edges for a respective three-dimensional point can include the K-nearest spatial neighbors to the respective three-dimensional point.

At (560), the method can include determining one or more occlusion scores. For example, the classification system can determine an occlusion score for each of the plurality of representations of historical three-dimensional datapoints of the classification database based at least in part on the current three-dimensional segmentation. The classification system can store the occlusion score for each of the plurality of representations of historical three-dimensional datapoints in the classification database.

At (570), the method can include identifying one or more datapoint sets from the classification database. For example, the classification system can identify a plurality of datapoint sets from the classification database. In some implementations, each of the plurality of datapoint sets can include one or more three-dimensional points and at least one feature vector corresponding to each of the one or more three-dimensional points. In some implementations, the classification database can identify a datapoint set for each three-dimensional point in the classification database.

At (580), the method can include receiving an enhanced three-dimensional segmentation. For example, the classification system can provide each of the plurality of datapoint sets as an input into a machine-learned enhancing model to receive the enhanced three-dimensional segmentation. The machine-learned enhancing model can be configured to output an enhanced feature classification for a three-dimensional point based on the datapoint set associated with the three-dimensional point. The enhanced feature classification can include a feature classification enhanced based on historical observations. The enhanced three-dimensional segmentation can include a plurality of enhanced three-dimensional datapoints. Each of the enhanced three-dimensional datapoints can include a three-dimensional point and an enhanced feature classification associated with the three-dimensional point.

At (590), the method can include identifying one or more travel way features. For example, the classification system can identify one or more travel way features based on data stored in the classification database. For example, the classification system can identify the one or more travel way features based at least in part on the current three-dimensional segmentation and the data indicative of a plurality of representations of historical three-dimensional datapoints of the classification database. For example, in some implementations, the classification system can identify one or more travel way features based at least in part on the enhanced three-dimensional segmentation.

Figure 6:
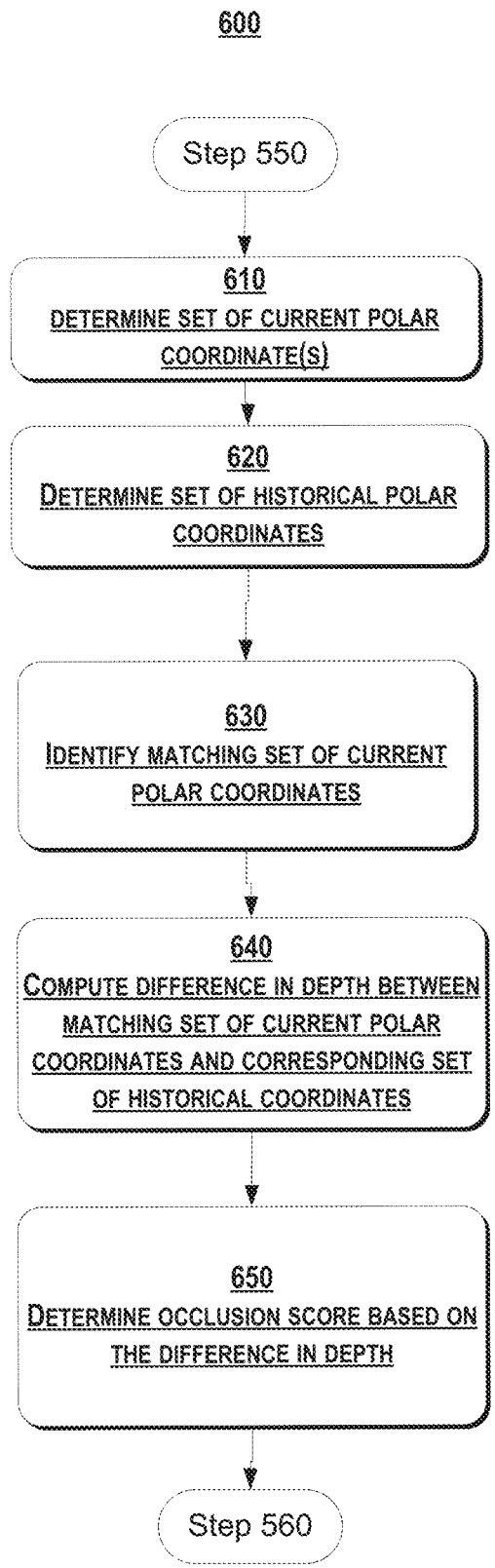
FIG. 6 depicts a flowchart diagram of an example method for determining an occlusion score according to example implementations of the present disclosure.

FIG. 6 depicts a flowchart diagram of an example method for determining an occlusion score according to example implementations of the present disclosure. One or more portion(s) of the method 600 can be can be implemented by a computing system that includes one or more computing devices such as, for example, the computing systems described with reference to the other figures (e.g., the vehicle computing system 100, the classification system 185, the operations computing system 190, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1 and/or 8), for example, to allow a vehicle 105 to determine an occlusion score for one or more historical observations. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for example illustrated purposes and is not meant to be limiting. One or more portions of method 600 can be performed additionally, or alternatively, by other systems.

Method 600 begins at (550) of method 500 whereby a computing system (e.g., vehicle computing system 100, classification system 185, and/or operations computing system 190, etc.) determines occlusion scores for one or more historical three-dimensional datapoints of the classification database.

At (610), the method 600 can include determining a set of current polar coordinates. For example, the classification system can determine a set of current polar coordinates for each current three-dimensional datapoint of the plurality of current three-dimensional datapoints. By way of example, the set of current polar coordinates can include one or more angular coordinates and a depth coordinate.

At (620), the method 600 can include determining a set of historical polar coordinates. For example, the classification system can determine a set of historical polar coordinates for each of the plurality of representations of historical three-dimensional datapoints. By way of example, the set of historical polar coordinates can include one or more angular coordinates and a depth coordinate. The classification system can determine the occlusion score for each of the plurality of representations of historical three-dimensional datapoints based on a comparison between a corresponding set of historical polar coordinates and a matching set of current polar coordinates.

For example, at (630), the method 600 can include identifying a matching set of current polar coordinates. The classification system can identify the matching set of current polar coordinates by comparing the angular coordinates of the each set of current polar coordinates with the angular coordinates of the corresponding set of historical polar coordinates. The matching set of current polar coordinates can include the set of current polar coordinates with the same or similar angular coordinates as the corresponding set of historical polar coordinates.

At (640), the method 600 can include computing a difference in depth between the matching set of current polar coordinates and corresponding set of historical polar coordinates. For example, the classification system can compute a difference in depth between the matching set of current polar coordinates and the corresponding set of historical polar coordinates. By way of example, the classification system can compute the difference in depth by subtracting the depth coordinate of the corresponding set of historical coordinates from the depth coordinate of the matching set of current polar coordinates.

At (650), the method 600 can include determining an occlusion score based on the difference in depth. For example, the classification system can determine the occlusion score based at least in part on the difference in depth. By way of example, the occlusion score can include a value indicative of the difference in depth between the matching set of current polar coordinates and the corresponding set of historical polar coordinates.

The method 600 can then return to (550) of method 500 whereby a computing system (e.g., vehicle computing system 100, classification system 185, operations computing system 190, etc.) stores the plurality of occlusion scores in the classification database.

Figure 7:
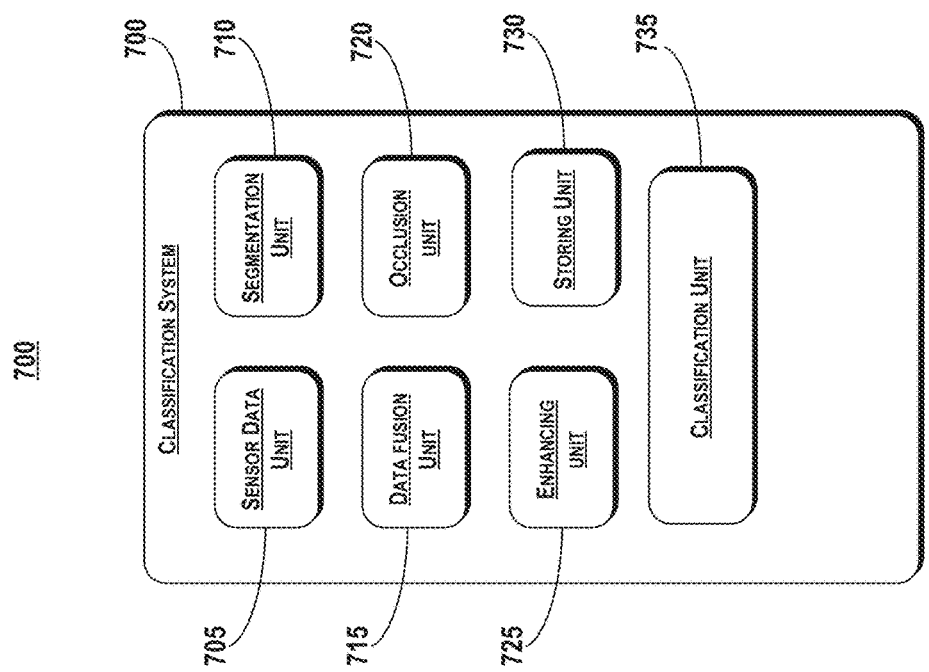
FIG. 7 depicts example system with various means for performing operations and functions according to example implementations of the present disclosure.

Various means can be configured to perform the methods and processes described herein. For example, FIG. 7 depicts a diagram of an example a computing system 700 that includes various means according to example embodiments of the present disclosure. The computing system 700 can be and/or otherwise include, for example, the classification system 700. The computing system 700 can include sensor data unit(s) 705, segmentation unit(s) 710, data fusion unit(s) 715, occlusion unit(s) 720, enhancing unit(s) 725, storing unit(s) 730, classification unit(s) 735 and/or other means for performing the operations and functions described herein. In some implementations, one or more of the units may be implemented separately. In some implementations, one or more units may be a part of or included in one or more other units.

These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods (e.g., 500, 600) and/or other operations described herein can be implemented as such algorithm(s). For instance, the means (e.g., the classification unit(s) 735) can be configured for identifying one or more travel way features in the surrounding environment of a vehicle. The means (e.g., the sensor data unit(s) 705) can be configured for obtaining two-dimensional data depicting a surrounding environment of a vehicle and three-dimensional data associated with the surrounding environment. In addition, the means (e.g., the segmentation unit(s) 710) can be configured for providing the two-dimensional data as one or more inputs into a machine-learned segmentation model to receive a two-dimensional segmentation as one or more outputs of the machine-learned segmentation model. As described herein, the machine-learned segmentation model can be configured to output a two-dimensional segmentation based on input two-dimensional data. The means (e.g., the data fusion unit(s) 715) can be configured for generating a current three-dimensional segmentation based at least in part on the two-dimensional data, the three-dimensional data, and the two-dimensional segmentation. For example, the means (e.g., the data fusion unit(s) 715) can be configured for fusing the three-dimensional data with the two-dimensional segmentation to generate the current three-dimensional segmentation. The means (e.g., the storing unit(s) 730) can be configured for storing data indicative of the current three-dimensional segmentation in a classification database. As described herein, the classification database can include data indicative of a plurality of representations of historical three-dimensional datapoints associated with one or more previously generated three-dimensional segmentations. The means (e.g., the classification unit(s) 735) can be configured for identify one or more travel way features based at least in part on the current three-dimensional segmentation and the data indicative of the plurality of representations of historical three-dimensional datapoints of the classification database.

The means (e.g., the occlusions unit(s) 720) can be configured for determining an occlusion score for each of the plurality of representations of historical three-dimensional datapoints based at least in part on the current three-dimensional segmentation. As described herein, the occlusion score can include data indicative of whether a feature classification corresponding to three-dimensional point is valid. The means (e.g., the storing unit(s) 730) can be configured for storing the occlusion score for each of the plurality of representations of historical three-dimensional datapoints in the classification database.

The means (e.g., the enhancing unit(s) 725) can be configured for identifying a plurality of datapoint sets from the classification database. As described herein, each of the plurality of datapoint sets can include one or more three-dimensional points and at least one feature vector corresponding to each to the one or more three-dimensional points. In addition, the means (e.g., the enhancing unit(s) 725) can be configured for providing each of the plurality of datapoint sets as an input into a machine-learned enhancing model to receive an enhanced three-dimensional segmentation. As described herein, the machine-learned enhancing model can be configured to output an enhanced classification for a three-dimensional point based on a datapoint set associated with the three-dimensional point. The enhanced three-dimensional segmentation can include a plurality of three-dimensional datapoints, each including a three-dimensional point and a corresponding enhanced classification. The means (e.g., the classification unit(s) 735) can be configured for identifying one or more travel way features based at least in part on the enhanced three-dimensional segmentation.

These described functions of the means are provided as examples and are not meant to be limiting. The means can be configured for performing any of the operations and functions described herein.

Figure 8:
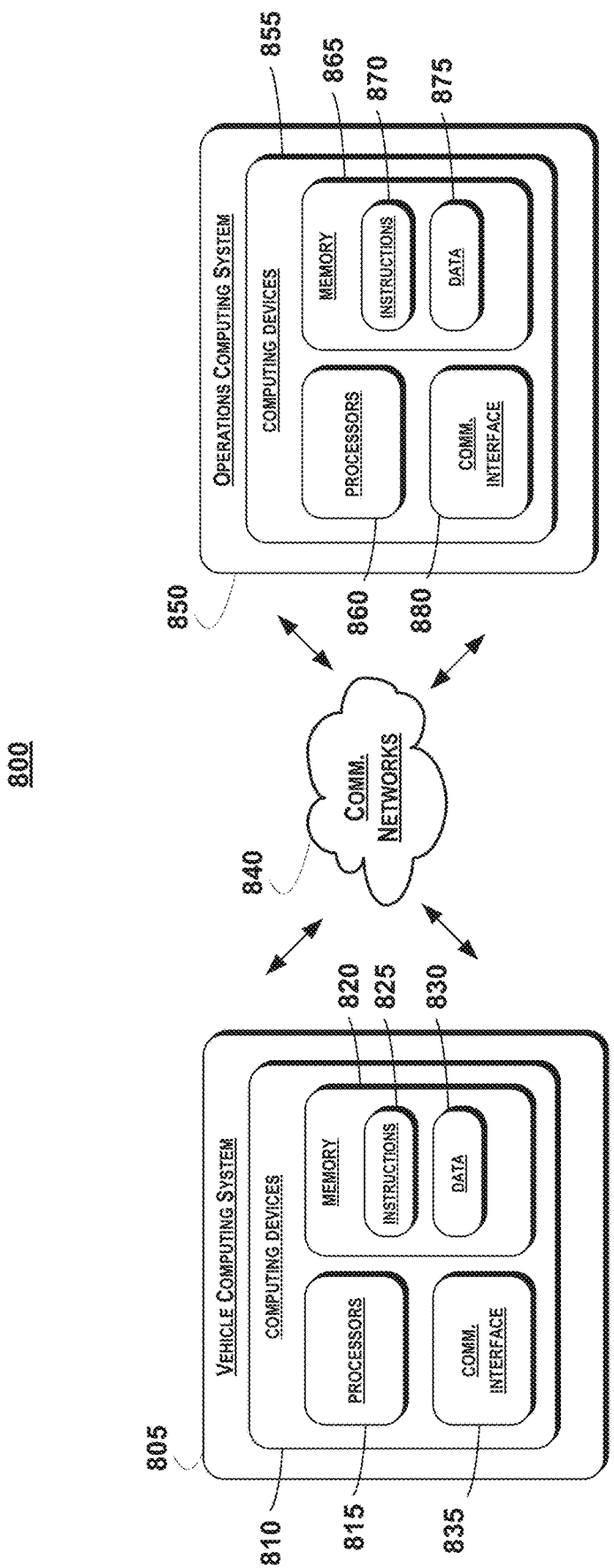
FIG. 8 depicts example system components according to example implementations of the present disclosure.

FIG. 8 depicts an example system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a vehicle computing system 805 of a vehicle. The vehicle computing system 805 can represent/correspond to the vehicle computing systems described herein (e.g., vehicle computing system 100). The example system 800 can include a remote computing system 850 (e.g., that is remote from the vehicle computing system 805). The remote computing system 850 can represent/correspond to, for example, any of the computing systems that are remote from the vehicle described herein (e.g., the operations computing system 190, etc.). The vehicle computing system 805 and the remote computing system 850 can be communicatively coupled to one another over one or more network(s) 840.

The computing device(s) 810 of the vehicle computing system 805 can include processor(s) 815 and a memory 820. The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, data registrar, etc., and combinations thereof.

The memory 820 can store information that can be accessed by the one or more processors 815. For instance, the memory 820 (e.g., one or more non-transitory computer-readable storage mediums, memory devices) onboard the vehicle can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815.

For example, the memory 820 can store instructions 825 that when executed by the one or more processors 815 cause the one or more processors 815 (e.g., the vehicle computing system 805) to perform operations such as any of the operations and functions of the vehicle computing system 100 (or for which it is configured), one or more of the operations and functions of the classification system 185 (or for which it is configured), one or more of the operations and functions of the operations computing systems 190 described herein (or for which it is configured), one or more of the operations and functions for travel way features in the surrounding environment of the vehicle, one or more portions of the method 500, one or more portions of method 600 and/or one or more of the other operations and functions of the computing systems described herein.

The memory 820 can store data 830 that can be obtained (e.g., acquired, received, retrieved, accessed, created, stored, written, manipulated, etc.). The data 830 can include, for instance, sensor data, map data, vehicle state data, perception data, prediction data, motion planning data, data associated with a vehicle client, data associated with a service entity's telecommunications network, data associated with an API, data associated with travel way features such as two-dimensional and three-dimensional data associated with the surrounding environment of a vehicle, and/or other data/information such as, for example, that described herein. In some implementations, the computing device(s) 810 can obtain data from one or more memories that are remote from the vehicle computing system 805.

The computing device(s) 810 can also include a communication interface 835 used to communicate with one or more other system(s) onboard a vehicle and/or a remote computing device that is remote from the vehicle (e.g., of the remote computing system 850). The communication interface 835 can include any circuits, components, software, etc. for communicating via one or more networks (e.g., network(s) 840). The communication interface 835 can include, for example, one or more of a communications controller, receiver, transceiver, transmitter, port, conductors, software and/or hardware for communicating data.

The remote computing system 850 can include one or more computing device(s) 855 that are remote from the vehicle computing system 805. The computing device(s) 855 can include one or more processors 860 and a memory 865. The one or more processors 860 can be any suitable processing device (e.g., a processor core, a microprocessor, an ASIC, a FPGA, a controller, a microcontroller, etc.) and can be one processor or a plurality of processors that are operatively connected. The memory 865 can include one or more tangible, non-transitory computer-readable storage media, such as RAM, ROM, EEPROM, EPROM, one or more memory devices, flash memory devices, data registrar, etc., and combinations thereof.

The memory 865 can store information that can be accessed by the one or more processors 860. For instance, the memory 865 (e.g., one or more tangible, non-transitory computer-readable storage media, one or more memory devices, etc.) can include computer-readable instructions 870 that can be executed by the one or more processors 860. The instructions 870 can be software written in any suitable programming language or can be implemented in hardware. Additionally, or alternatively, the instructions 870 can be executed in logically and/or virtually separate threads on processor(s) 860.

For example, the memory 865 can store instructions 870 that when executed by the one or more processors 860 cause the one or more processors 860 to perform operations such as any of the operations and functions of the operations computing systems 190 described herein, any of the operations and functions of the classification system 185 as described herein, one or more of the operations and functions for determining travel way features in the surrounding environment of a vehicle, one or more portions of the method 500, one or more portions of the method 600, and/or one or more of the other operations and functions described herein.

The memory 865 can store data 875 that can be obtained. The data 875 can include, for instance, data associated with vehicles (e.g., sensor data, map data, vehicle state data, perception data, prediction data, motion planning data, data associated with a vehicle client, data associated with a service entity's telecommunications network, data associated with an API, etc.), data associated with travel way features such as historical observations stored in a classification database, and/or other data/information such as, for example, that described herein. In some implementations, the computing device(s) 855 can obtain data from one or more memories that are remote from the computing system 850 and/or are onboard a vehicle.

The computing device(s) 855 can also include a communication interface 880 used to communicate with one or more system(s) local to and/or remote from the computing system 850. The communication interface 880 can include any circuits, components, software, etc. for communicating via one or more networks (e.g., network(s) 840). The communication interface 880 can include, for example, one or more of a communications controller, receiver, transceiver, transmitter, port, conductors, software and/or hardware for communicating data.

The network(s) 840 can be any type of network or combination of networks that allows for communication between devices. In some implementations, the network(s) 840 can include one or more of a local area network, wide area network, the Internet, secure network, cellular network, mesh network, peer-to-peer communication link and/or some combination thereof and can include any number of wired or wireless links. Communication over the network(s) 840 can be accomplished, for instance, via a communication interface using any type of protocol, protection scheme, encoding, format, packaging, etc.

Computing tasks, operations, and functions discussed herein as being performed at a vehicle (e.g., via the vehicle computing system) can instead be performed by computing device(s) that are remote from the vehicle (e.g., via a vehicle provider computing system, an operations computing system 190, etc.), and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems can alter the communicated data in some manner before communicating it to another computing system. Moreover, data obtained by a computing system can be manipulated in some manner before it is communicated to another system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for identifying travel way features, the method comprising:
    obtaining two-dimensional data and three-dimensional data associated with an environment of an autonomous vehicle at a current time;
    processing the two-dimensional data with a machine-learned segmentation model to generate a two-dimensional segmentation for the environment;
    generating a current three-dimensional segmentation based at least in part on the three-dimensional data and the two-dimensional segmentation;
    identifying one or more historical three-dimensional datapoints previously generated for the environment at one or more times preceding the current time; and
    determining one or more travel way features within the environment at the current time based on the current three-dimensional segmentation and the one or more historical three-dimensional datapoints previously generated for the environment at the one or more times preceding the current time.

2. The computer-implemented method of claim 1, further comprising:
    updating a map based on the one or more travel way features within the environment.

3. The computer-implemented method of claim 1, further comprising:
    initiating a motion of the autonomous vehicle based on the one or more travel way features within the environment.

4. The computer-implemented method of claim 1, wherein identifying the one or more historical three-dimensional datapoints previously generated for the environment at the one or more times preceding the current time comprises:
    identifying the one or more historical three-dimensional datapoints previously generated for the environment at the one or more times preceding the current time based on a spatial relationship between the one or more historical three-dimensional datapoints and the current three-dimensional segmentation.

5. The computer-implemented method of claim 1, further comprising:
    storing data indicative of the current three-dimensional segmentation in a classification database comprising the one or more historical three-dimensional datapoints previously generated for the environment at the one or more times preceding the current time.

6. The computer-implemented method of claim 5, wherein the classification database defines a dynamic graph based on a spatial relationship between one or more of a plurality of three-dimensional points.

7. The computer-implemented method of claim 6, wherein the current three-dimensional segmentation comprises data indicative of a plurality of current three-dimensional datapoint, and wherein the plurality of three-dimensional points comprise the plurality of current three-dimensional datapoints and the one or more historical three-dimensional datapoints.

8. The computer-implemented method of claim 1, wherein at least one of the one or more historical three-dimensional datapoints previously generated for the environment at the one or more times preceding the current time comprises a three-dimensional point and a feature vector corresponding to the three-dimensional point.

9. The computer-implemented method of claim 8, wherein the feature vector corresponding to the three-dimensional point comprises data indicative of at least one of a feature classification, an occlusion score, a LiDAR intensity, or a vehicle distance corresponding to the three-dimensional point.

10. The computer-implemented method of claim 9, wherein the feature classification corresponding to the three-dimensional point comprises a class-wise probability estimate indicative of a probability that the three-dimensional point corresponds to a feature of interest.

11. An autonomous vehicle control system comprising:
    one or more processors; and
    one or more tangible, non-transitory, computer readable media that collectively store instructions that when executed by the one or more processors cause the autonomous vehicle control system to perform operations comprising:
    obtaining two-dimensional data and three-dimensional data associated with an environment of an autonomous vehicle at a current time;
    processing the two-dimensional data with a machine-learned segmentation model to generate a two-dimensional segmentation for the environment;
    generating a current three-dimensional segmentation based at least in part on the three-dimensional data and the two-dimensional segmentation;
    identifying one or more historical three-dimensional datapoints previously generated for the environment at one or more times preceding the current time; and
    determining one or more travel way features within the environment at the current time based on the current three-dimensional segmentation and the one or more historical three-dimensional datapoints previously generated for the environment at the one or more times preceding the current time.

12. The autonomous vehicle control system of claim 11, wherein the operations further comprise:
    initiating a motion of the autonomous vehicle based on the one or more travel way features within the environment.

13. The autonomous vehicle control system of claim 11, wherein the operations further comprise:
    updating a map based on the one or more travel way features within the environment.

14. The autonomous vehicle control system of claim 13, wherein updating the map based on the one or more travel way features within the environment comprises:
    determining a current position for the autonomous vehicle; and
    updating the map based on the one or more travel way features within the environment and the current position of the autonomous vehicle.

15. The autonomous vehicle control system of claim 11, wherein identifying the one or more historical three-dimensional datapoints previously generated for the environment at the one or more times preceding the current time comprises:
identifying the one or more historical three-dimensional datapoints previously generated for the environment at the one or more times preceding the current time based on a spatial relationship between the one or more historical three-dimensional datapoints and the current three-dimensional segmentation.

16. The autonomous vehicle control system of claim 11, wherein the operations further comprise:
storing data indicative of the current three-dimensional segmentation in a classification database comprising the one or more historical three-dimensional datapoints previously generated for the environment at the one or more times preceding the current time.

17. An autonomous vehicle comprising:
one or more processors;
one or more tangible, non-transitory, computer readable media that collectively store instructions that when executed by the one or more processors cause the one or more processors to perform operations comprising:
obtaining two-dimensional data and three-dimensional data associated with an environment of the autonomous vehicle at a current time;
processing the two-dimensional data with a machine-learned segmentation model to generate a two-dimensional segmentation for the environment;
generating a current three-dimensional segmentation based at least in part on the three-dimensional data and the two-dimensional segmentation;
identifying one or more historical three-dimensional datapoints previously generated for the environment at one or more times preceding the current time; and
determining one or more travel way features within the environment at the current time based on the current three-dimensional segmentation and the one or more historical three-dimensional datapoints previously generated for the environment at the one or more times preceding the current time.

18. The autonomous vehicle of claim 17, wherein the operations further comprise:
initiating a motion of the autonomous vehicle based on the one or more travel way features within the environment.

19. The autonomous vehicle of claim 17, wherein the operations further comprise:
updating a map based on the one or more travel way features within the environment.

20. The autonomous vehicle of claim 19, wherein updating the map based on the one or more travel way features within the environment comprises:
determining a current position for the autonomous vehicle; and
updating the map based on the one or more travel way features within the environment and the current position of the autonomous vehicle.

* * * * *